US010061137B2

(12) United States Patent
Smits

(10) Patent No.: US 10,061,137 B2
(45) Date of Patent: *Aug. 28, 2018

(54) SMART HEAD-MOUNTED PROJECTION SYSTEM

(71) Applicant: Gerard Dirk Smits, Los Gatos, CA (US)

(72) Inventor: Gerard Dirk Smits, Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/804,392

(22) Filed: Nov. 6, 2017

(65) Prior Publication Data

US 2018/0059428 A1    Mar. 1, 2018

Related U.S. Application Data

(63) Continuation of application No. 14/671,904, filed on Mar. 27, 2015, now Pat. No. 9,810,913.

(60) Provisional application No. 61/967,886, filed on Mar. 28, 2014.

(51) Int. Cl.
G01C 3/08 (2006.01)
G02B 27/22 (2018.01)
G02B 5/124 (2006.01)

(52) U.S. Cl.
CPC ......... G02B 27/2235 (2013.01); G02B 5/124 (2013.01)

(58) Field of Classification Search
CPC ...... G06T 3/40; G02B 5/136; G02B 27/2235; G02B 5/124
See application file for complete search history.

(56) References Cited

U.S. PATENT DOCUMENTS 4,019,262 A    4/1977 Breglia et al.
4,340,274 A    7/1982 Spooner
4,820,041 A    4/1989 Davidson et al.
5,052,820 A    10/1991 McGinniss et al.
(Continued)

FOREIGN PATENT DOCUMENTS

EP    0722109 A1    7/1996
JP    11119184 A    4/1999
(Continued)

OTHER PUBLICATIONS

Savage, P., "GDC 2013: Valve Michael Abrash on the challenges of VR—'a new world is emerging'," PCGamer, Apr. 2, 2013, 6 pages.
(Continued)

Primary Examiner — Samantha K Abraham
(74) Attorney, Agent, or Firm — John W. Branch; Lowe Graham Jones PLLC

(57) ABSTRACT

Embodiments are directed towards a system for enabling a user to view an image on a surface. The system may include projector(s), sensor, projection surface or screen, and processor. The projectors may project light for an image onto the surface. The sensor may detect light reflected off the surface. The surface may include multiple types of surface elements, such as multiple first elements positioned as border of a display area on the surface to provide feedback regarding the surface and multiple second elements positioned within the border of the display area to reflect the image to the user. The processor may determine characteristics of the border of the display area based on light reflected to the sensor from first elements. And it may modify parameters of the image based on the characteristics of the border of the display area.

20 Claims, 17 Drawing Sheets

(56) References Cited

U.S. PATENT DOCUMENTS

| | | |
|---|---|---|
| 5,107,122 A | 4/1992 | Barkan et al. |
| 5,115,230 A | 5/1992 | Smoot |
| 5,521,722 A | 5/1996 | Colvill et al. |
| 5,559,322 A | 9/1996 | Jacoby et al. |
| 5,572,251 A | 11/1996 | Ogawa |
| 5,580,140 A | 12/1996 | Katz et al. |
| 5,661,506 A | 8/1997 | Lazzouni et al. |
| 5,812,664 A | 9/1998 | Bernobich et al. |
| 5,914,783 A | 6/1999 | Barrus |
| 5,930,378 A | 7/1999 | Kubota et al. |
| 6,115,022 A | 9/2000 | Mayer, III et al. |
| 6,195,446 B1 | 2/2001 | Skoog |
| 6,307,526 B1 | 10/2001 | Mann |
| 6,404,416 B1 | 6/2002 | Kahn et al. |
| 6,545,670 B1 | 4/2003 | Pryor |
| 6,670,603 B2 | 12/2003 | Shimada et al. |
| 6,704,000 B2 | 3/2004 | Carpenter |
| 6,710,767 B1 | 3/2004 | Hasegawa et al. |
| 6,766,066 B2 | 7/2004 | Kitazawa |
| 6,982,683 B2 | 1/2006 | Stanton |
| 7,119,965 B1 | 10/2006 | Rolland et al. |
| 7,144,117 B2 | 12/2006 | Kojima |
| 7,182,465 B2 | 2/2007 | Fuchs et al. |
| 7,232,229 B2 | 6/2007 | Peeters et al. |
| 7,262,765 B2 | 8/2007 | Brown et al. |
| 7,289,110 B2 | 10/2007 | Hansson |
| 7,303,289 B2 | 12/2007 | Fujiwara |
| 7,511,847 B2 | 3/2009 | Silverbrook et al. |
| 7,787,134 B2 | 8/2010 | Kohnen et al. |
| 7,911,444 B2 | 3/2011 | Yee |
| 8,170,329 B2 | 5/2012 | Seko et al. |
| 8,282,222 B2 | 10/2012 | Smits |
| 8,297,758 B2 | 10/2012 | Choi et al. |
| 8,430,512 B2 | 4/2013 | Smits |
| 8,493,573 B2 | 7/2013 | Chinn et al. |
| 8,573,783 B2 | 11/2013 | Smits |
| 8,696,141 B2 | 4/2014 | Smits |
| 8,711,370 B1 | 4/2014 | Smits |
| 8,773,512 B1 | 7/2014 | Rafii |
| 8,957,847 B1 | 2/2015 | Karakotsios et al. |
| 8,994,780 B2 | 3/2015 | Moore |
| 9,151,607 B2 | 10/2015 | Davies et al. |
| 9,813,673 B2 | 11/2017 | Smits |
| 2001/0043165 A1 | 11/2001 | Stanton |
| 2002/0036765 A1 | 3/2002 | McCaffrey et al. |
| 2002/0039138 A1 | 4/2002 | Edelson et al. |
| 2002/0067466 A1 | 6/2002 | Covannon et al. |
| 2002/0145588 A1 | 10/2002 | McCahon et al. |
| 2003/0010888 A1 | 1/2003 | Shimada et al. |
| 2003/0045034 A1 | 3/2003 | Davis et al. |
| 2003/0156260 A1 | 8/2003 | Putilin et al. |
| 2003/0202234 A1 | 10/2003 | Taylor et al. |
| 2003/0202679 A1 | 10/2003 | Rodriguez |
| 2003/0214710 A1 | 11/2003 | Takahashi et al. |
| 2003/0222849 A1 | 12/2003 | Starkweather |
| 2004/0006424 A1 | 1/2004 | Joyce et al. |
| 2004/0054359 A1 | 3/2004 | Ruiz et al. |
| 2004/0114834 A1 | 6/2004 | Fisher |
| 2004/0218155 A1 | 11/2004 | Schenk et al. |
| 2005/0035943 A1 | 2/2005 | Kojima |
| 2005/0052635 A1 | 3/2005 | Xie et al. |
| 2005/0083248 A1 | 4/2005 | Biocca et al. |
| 2005/0099664 A1 | 5/2005 | Yamaoka |
| 2005/0159893 A1 | 7/2005 | Isaji et al. |
| 2005/0195387 A1 | 9/2005 | Zhang et al. |
| 2005/0219530 A1 | 10/2005 | Horibe et al. |
| 2005/0273830 A1 | 12/2005 | Silver et al. |
| 2006/0028374 A1 | 2/2006 | Fullerton |
| 2006/0028622 A1 | 2/2006 | Nojima et al. |
| 2006/0132447 A1 | 6/2006 | Conrad |
| 2006/0132472 A1 | 6/2006 | Peeters et al. |
| 2006/0132729 A1 | 6/2006 | Engle |
| 2006/0197936 A1 | 9/2006 | Liebman |
| 2006/0256133 A1 | 11/2006 | Rosenberg |
| 2007/0046625 A1 | 3/2007 | Yee |
| 2007/0053679 A1 | 3/2007 | Beniyama et al. |
| 2007/0064242 A1 | 3/2007 | Childers |
| 2007/0138371 A1 | 6/2007 | Marshall |
| 2007/0182949 A1 | 8/2007 | Niclass |
| 2007/0273610 A1 | 11/2007 | Baillot |
| 2008/0018591 A1 | 1/2008 | Pittel et al. |
| 2008/0266169 A1 | 10/2008 | Akita |
| 2008/0291213 A1 | 11/2008 | Bhogal |
| 2008/0316026 A1 | 12/2008 | Yenisch et al. |
| 2008/0317077 A1 | 12/2008 | Hoving et al. |
| 2009/0096994 A1 | 4/2009 | Smits |
| 2009/0147239 A1 | 6/2009 | Zhu et al. |
| 2009/0285590 A1 | 11/2009 | Orsley |
| 2010/0002154 A1 | 1/2010 | Hua |
| 2010/0008588 A1 | 1/2010 | Feldkhun et al. |
| 2010/0142856 A1 | 6/2010 | Takeuchi et al. |
| 2010/0149518 A1 | 6/2010 | Nordenfelt et al. |
| 2011/0001793 A1 | 1/2011 | Moriyama et al. |
| 2011/0211243 A1 | 9/2011 | Smits |
| 2011/0249157 A1 | 10/2011 | Fredembach et al. |
| 2011/0304842 A1 | 12/2011 | Kao et al. |
| 2012/0017147 A1 | 1/2012 | Mark |
| 2012/0132713 A1 | 5/2012 | Chaum |
| 2012/0134537 A1 | 5/2012 | Yoon et al. |
| 2012/0140231 A1 | 6/2012 | Knox et al. |
| 2012/0187296 A1 | 7/2012 | Hollander et al. |
| 2012/0250152 A1 | 10/2012 | Larson et al. |
| 2012/0320013 A1 | 12/2012 | Perez et al. |
| 2013/0003081 A1 | 1/2013 | Smits |
| 2013/0021271 A1 | 1/2013 | Guo |
| 2013/0079983 A1 | 3/2013 | Ehilgen et al. |
| 2013/0088465 A1 | 4/2013 | Geller et al. |
| 2013/0176561 A1 | 7/2013 | Hidaka |
| 2013/0229669 A1 | 9/2013 | Smits |
| 2013/0239057 A1 | 9/2013 | Ubillos et al. |
| 2013/0300637 A1 | 11/2013 | Smits et al. |
| 2013/0300670 A1 | 11/2013 | Besperstov et al. |
| 2013/0342813 A1 | 12/2013 | Wang |
| 2014/0098179 A1 | 4/2014 | Moore |
| 2014/0146243 A1 | 5/2014 | Liu et al. |
| 2014/0176954 A1 | 6/2014 | Scott et al. |
| 2014/0215841 A1 | 8/2014 | Danbury et al. |
| 2014/0267620 A1 | 9/2014 | Bridges |
| 2014/0273752 A1 | 9/2014 | Bajaj et al. |
| 2014/0285818 A1 | 9/2014 | Holz |
| 2014/0307248 A1 | 10/2014 | Giger et al. |
| 2015/0066196 A1 | 3/2015 | Wooldridge et al. |
| 2015/0091815 A1 | 4/2015 | Michaelis |
| 2015/0279114 A1 | 10/2015 | Yonekubo |
| 2015/0286293 A1 | 10/2015 | Gruhlke et al. |
| 2016/0011312 A1 | 1/2016 | Leyva |
| 2016/0014403 A1 | 1/2016 | Stroetmann |
| 2016/0041266 A1 | 2/2016 | Smits |
| 2016/0050345 A1 | 2/2016 | Longbotham et al. |
| 2016/0335778 A1 | 11/2016 | Smits |
| 2017/0131090 A1 | 5/2017 | Bronstein et al. |

FOREIGN PATENT DOCUMENTS

| | | |
|---|---|---|
| JP | 2001045381 A | 2/2001 |
| JP | 2003029201 A | 1/2003 |
| JP | 2004132914 A | 4/2004 |
| JP | 2011197674 A | 10/2011 |
| KR | 10-2011-0115752 A | 10/2011 |
| WO | 1992/18971 A | 10/1992 |
| WO | 2000/034818 A1 | 6/2000 |
| WO | 2006/063577 A1 | 6/2006 |
| WO | 2009/049272 A2 | 4/2009 |
| WO | 2011/109402 A2 | 9/2011 |
| WO | 2012/054231 A2 | 4/2012 |
| WO | 2014141115 A2 | 9/2014 |

OTHER PUBLICATIONS

European Search Report for European Patent Application No. 08837063.0 dated Nov. 19, 2010, 8 pages.

Communication Pursuant to Article 94(3) EPC in European Patent Application No. 08837063.0 dated Dec. 27, 2011, 5 pages.

(56) References Cited

OTHER PUBLICATIONS

Communication Pursuant to Article 94(3) EPC in European Patent Application No. 08837063.0 dated Oct. 22, 2012, 6 pages.
International Search Report and Written Opinion in International Patent Application No. PCT/US2008/079663 dated Apr. 30, 2009, 5 pages.
International Search Report and Written Opinion in International Patent Application No. PCT/US2011/026691 dated Oct. 24, 2011, 7 pages.
International Search Report in International Patent Application No. PCT/US2011/054751 dated Jan. 30, 2012, 1 page.
International Preliminary Report on Patentability in International Patent Application No. PCT/US2008/079663 dated Jan. 25, 2010, 11 pages.
International Preliminary Report on Patentability issued in PCT/US2011/026691 dated Sep. 4, 2012, 7 pages.
International Preliminary Report on Patentability issued in PCT/US2011/054751 dated Apr. 9, 2013, 7 pages.
Official Communication for U.S. Appl. No. 12/249,899 dated Sep. 14, 2011, 11 pages.
Official Communication for U.S. Appl. No. 12/249,899 dated Mar. 13, 2012, 12 pages.
Official Communication for U.S. Appl. No. 12/249,899 dated Jun. 6, 2012, 12 pages.
Official Communication for U.S. Appl. No. 13/037,949 dated Nov. 2, 2012, 12 pages.
Official Communication for U.S. Appl. No. 13/037,949 dated Aug. 26, 2013, 9 pages.
Official Communication for U.S. Appl. No. 13/605,948 dated Dec. 31, 2012, 10 pages.
Official Communication for U.S. Appl. No. 13/858,762 dated Sep. 13, 2013, 16 pages.
Official Communication for U.S. Appl. No. 13/877,652 dated Mar. 12, 2015, 20 pages.
Official Communication for U.S. Appl. No. 14/046,374 dated Feb. 20, 2014, 10 pages.
European Supplementary Search Report for European Patent Application No. 11834848.1 dated Feb. 21, 2014, 7 pages.
Official Communication for U.S. Appl. No. 13/858,762 dated Jan. 31, 2014, 15 pages.
Official Communication for U.S. Appl. No. 14/048,954 dated Feb. 26, 2014, 24 pages.
Official Communication for U.S. Appl. No. 14/048,954 dated Oct. 22, 2014, 8 pages.
International Search Report and Written Opinion for application PCT/US2015/023184 dated Jun. 29, 2015, 13 pages.
Official Communication for U.S. Appl. No. 13/877,652 dated Aug. 18, 2015, 21 pages.
Official Communication for U.S. Appl. No. 14/636,062 dated Sep. 25, 2015, 8 pages.
Official Communication for U.S. Appl. No. 14/671,904 dated Sep. 22, 2015, 15 pages.
Official Communication for U.S. Appl. No. 14/636,062 dated Jun. 2, 2015, 7 pages.
International Search Report and Written Opinion for PCT/US2015/044691 dated Nov. 18, 2015, 12 pages.
Official Communication for U.S. Appl. No. 14/823,668 dated Oct. 30, 2015, 12 pages.
Official Communication for U.S. Appl. No. 14/636,062 dated Dec. 14, 2015, 3 pages.
Official Communication for U.S. Appl. No. 14/823,668 dated Feb. 24, 2016, 15 pages.
Official Communication for U.S. Appl. No. 14/671,904 dated Feb. 22, 2016, 13 pages.
Official Communication for U.S. Appl. No. 13/877,652 dated Feb. 10, 2016, 22 pages.
Official Communication for U.S. Appl. No. 14/636,062 dated Feb. 1, 2016, 9 pages.
O'Toole, M., et al., Homogeneous Codes for Energy-Efficient Illumination and Imaging. ACM Transactions on Graphics, 34(4), 35:1-35:13.
Official Communication for U.S. Appl. No. 14/823,668 dated May 18, 2016, 10 pages.
Official Communication for U.S. Appl. No. 14/218,643 dated Jun. 23, 2016, 11 pages.
Official Communication for U.S. Appl. No. 13/877,652 dated Aug. 12, 2016, (22 pages).
Official Communication for U.S. Appl. No. 15/194,502 dated Aug. 19, 2016, (12 pages).
Official Communication for U.S. Appl. No. 14/636,062 dated Aug. 24, 2016, (9 pages).
International Search Report and Written Opinion for Application PCT/US2016/027386 dated Aug. 26, 2016, 10 pages.
Official Communication for U.S. Appl. No. 14/671,904 dated Sep. 28, 2016, 14 pages.
Official Communication for U.S. Appl. No. 14/218,643 dated Nov. 1, 2016, 10 pages.
Kanzawa, Y., et al., "Human Skin Detection by Visible and Near-Infrared imaging," IAPR Conference on Machine Vision Applications, Jun. 13-15, 2011, Nara Japan, 5 pages.
Office Communication for U.S. Appl. No. 13/877,652 dated May 31, 2017, 23 pages.
Office Communication for U.S. Appl. No. 15/194,502 dated Mar. 9, 2017, 7 pages.
International Search Report and Written Opinion for International Application No. PCT/US2016/067626 dated Mar. 16, 2017, 12 pages.
Office Communication for U.S. Appl. No. 14/671,904 dated May 5, 2017, 11 pages.
Office Communication for U.S. Appl. No. 15/411,959 dated May 11, 2017, 9 pages.
International Search Report and Written Opinion for International Application No. PCT/US2017/014616 dated May 1, 2017, 11 pages.
Official Communication for U.S. Appl. No. 15/384,227 dated Feb. 7, 2017, 8 pages.
Official Communication for U.S. Appl. No. 15/384,227 dated Jul. 19, 2017, 5 pages.
Official Communication for U.S. Appl. 14/671,904 dated Aug. 18, 2017, 7 pages.
Official Communication for U.S. Appl. No. 15/194,502 dated Aug. 15, 2017, 7 pages.
Official Communication for U.S. Appl. No. 15/411,959 dated Aug. 29, 2017, 5 pages.
Official Communication for U.S. Appl. No. 13/877,652 dated Dec. 6, 2017, 8 pages.
Official Communication for U.S. Appl. No. 15/799,149 dated Jan. 10, 2018, 7 pages.
Official Communication for U.S. Appl. No. 15/444,182 dated Feb. 14, 2018, 8 pages.
Official Communication for U.S. Appl. No. 15/194,502 dated Feb. 12, 2018, 9 pages.
Official Communication for U.S. Appl. No. 15/804,909 dated Feb. 12, 2018, 14 pages.
Official Communication for U.S. Appl. No. 15/098,285 dated Apr. 19, 2018, 69 pages.
International Search Report and Written Opinion for International Patent Application No. PCT/US2017/068377 dated Apr. 17, 2018,12 pages.

SMART HEAD-MOUNTED PROJECTION SYSTEM

CROSS-REFERENCE TO RELATED APPLICATIONS

This Utility Patent Application is a Continuation of U.S. patent application Ser. No. 14/671,904 filed on Mar. 27, 2015, now U.S. Pat. No. 9,810,913 issued on Nov. 7, 2017, which is based on a previously filed U.S. Provisional Patent Application U.S. Ser. No. 61/967,886 filed on Mar. 28, 2014, the benefit of the filing dates of which are claimed under 35 U.S.C. § 120 and § 119(e), and the contents of which are each further incorporated in entirety by reference.

TECHNICAL FIELD

The present invention relates generally to projection systems, and more particularly, but not exclusively, to employing a screen with a different types of surface elements to provide information and feedback to a projector system.

BACKGROUND

Today, the utilization of 3D technology can be found in many aspects of life. Such 3D environments are generally designed for an entire audience to view at the same time. However, this theater-type environment can limit an individual's ability to have a personalized or private experience. Personalized or head-mounted projection systems typically require the user to be positioned at a designated angle to the viewing surface. However, during a 3D experience a user may move their head to "avoid" an object flying at them. This head motion can result in unwanted movement in the projected image, which can greatly reduce the user's enjoyment of the experience. It is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
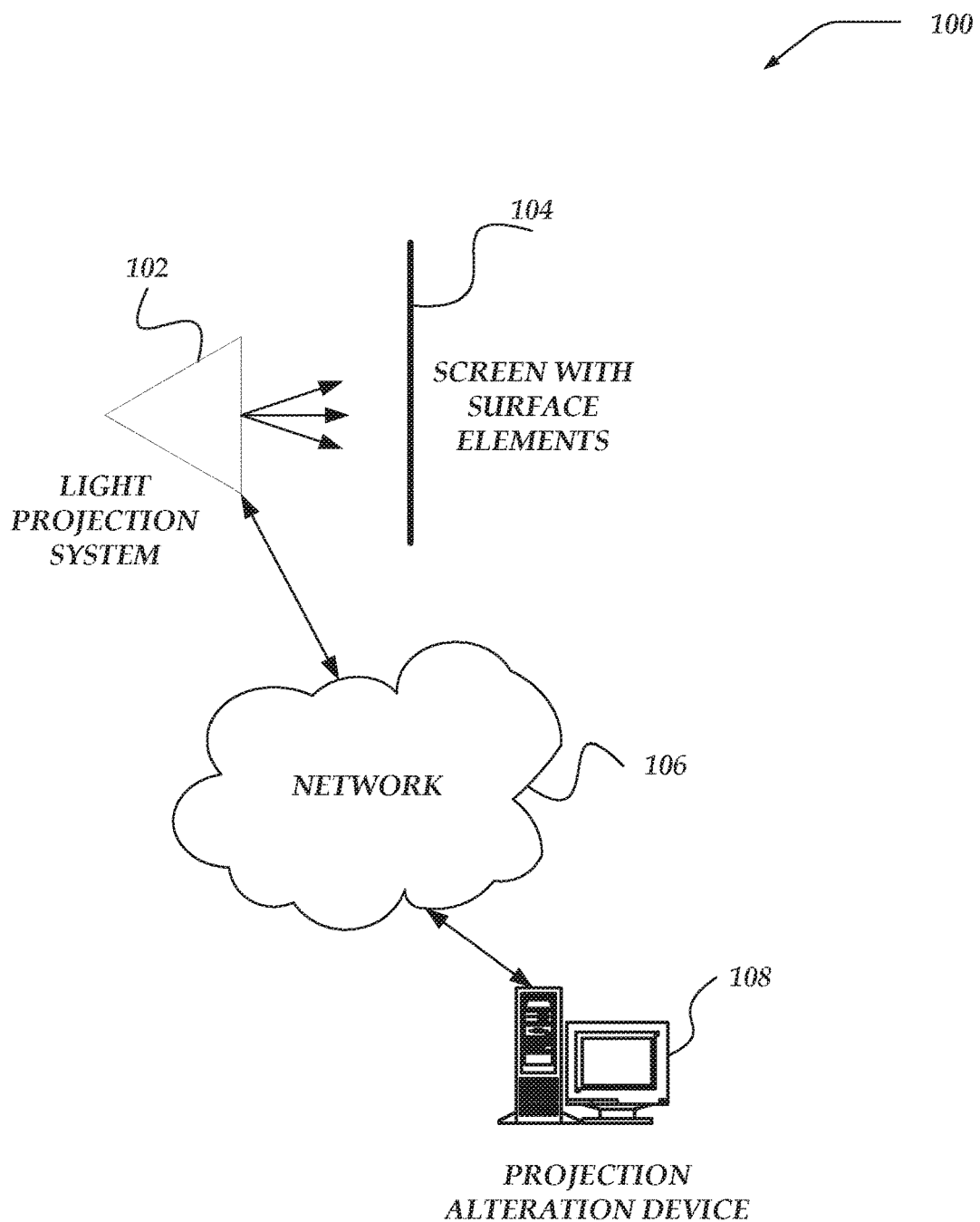
FIG. 1 is a system diagram of an environment in which embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "light projection system," "projection system," or "projection device" refers to a device arranged to project a beam onto a remote surface, such as a screen.

As used herein, the term "display surface," "display area," or "projection area" refers to an area on a screen specified for projecting an image. The display surface may include a plurality of surface elements that can reflect the projected image back to the user.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a system for enabling a user to view an image on a surface with automated view adjustment, privacy, annotation, scanning and interactivity. The surface, such as a screen may include, specially configured embedded retro reflective fiducial structures to enable strong and accurate spatially multiplexed optical feedback substantially invisible to the user.

The system may include one or more projectors, a sensor, a projection surface or screen, and a processor. The one or more projectors may project light for an image onto the surface. The sensor may detect light reflected off the surface. The surface may include one or more types of elements located on the surface.

A plurality of first elements (e.g., full retro reflector (FRR) elements) may be positioned as border of a display area on the surface. Each of the first elements reflect light projected from the one or more projectors to the sensor and this reflected light being non-visible to the user. A plurality of second elements (e.g., modified (MRR) retro reflector elements) may be positioned within the border of the display area. The plurality of second elements reflect light for the image from the one or more projectors to the user for viewing the image.

In some embodiments, the surface may include a plurality of third elements (e.g., FRR elements) that reflect light from the one or more projectors onto the sensor and that represent an embedded code of surface information. In other embodiments, the surface may include a plurality of other elements (e.g., wide modified retro reflector elements) that reflect light from the one or more projectors onto the sensor and that provide feedback on locations relative to the display area of objects positioned between the one or more projectors and the surface, wherein the user is enabled to interact with the image.

The processor may performs a variety of actions. For example, the processor may determine one or more characteristics of the border of the display area based on light reflected to the sensor from the plurality of first elements. And modify one or more parameters of the image based on the one or more characteristics of the border of the display area. In various embodiments, this modification may include tracking the border of the display area by continuously determining the one or more characteristics of the border, and dynamically modifying one or more of a size, a shape, or an orientation of the image to stay within the tracked border. In some embodiments, a distance from the one or more projectors to the surface may be determined based on a triangulation of light from a first projector that is reflected off a wide modified retro reflector on the surface onto the sensor, wherein the sensor is remote to the first projector.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes network 106, light projection system 102, screen 104, and projection alteration device 108.

Light projection system 102 is described in more detail below. Briefly, however, light projection system 102 may include one or more projectors for projecting light off screen 104 to a user. In various embodiments, light projection system 102 may be a head-mounted projector system. Light projection system 102 may also include one or more sensors for detecting light reflected off screen 104.

One embodiment of projection alteration device 108 is described in more detail below in conjunction with FIG. 2. Briefly, however, projection alteration device 108 includes virtually any network device capable of determining a location of a display surface on screen 104 based on reflected light from specific surface elements on the screen, as described herein. Based on the detected display surface, projection alteration device 108 may alter or otherwise modify one or more parameters of the image being projected by light projection system 102 to stay within the display surface. It should be understood that the functionality of projection alteration device 108 may be performed by light projection system 102 itself without communicating to a separate device.

Network 106 may be configured to couple network computers with other computing devices, including light projection system 102 with projection alteration device 108. In some embodiments, network 106 may include various wired networks, wireless networks, or any combination thereof. In various embodiments, network 106 may be enabled to employ various forms of communication technology, topology, computer-readable media, or the like, for communicating information from one electronic device to another. For example, network 106 can include direct communication connections (such as through a universal serial bus (USB) port), Wi-Fi or Bluetooth connections, or the like.

Illustrative Network Device

Figure 2:
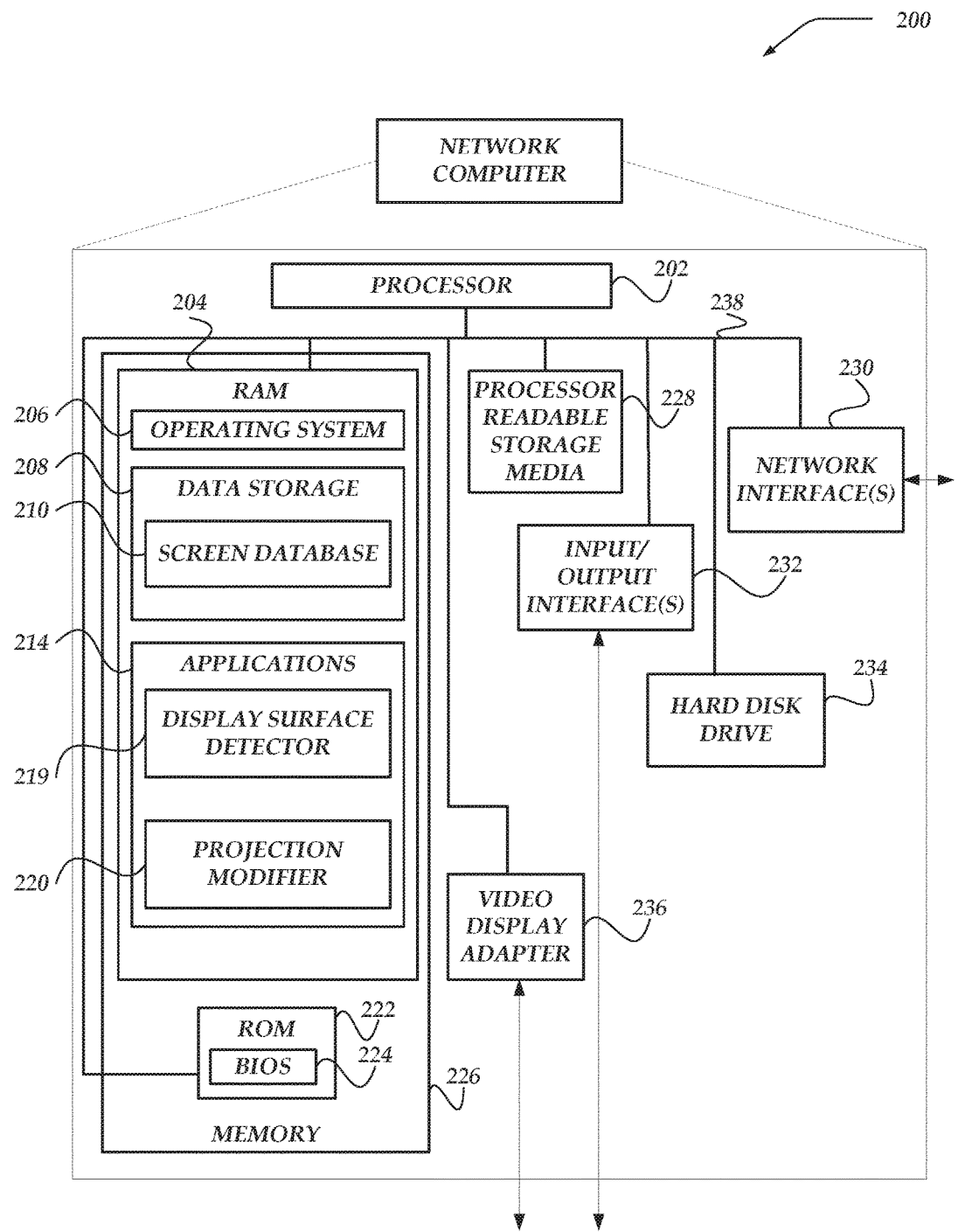
FIG. 2 shows an embodiment of a network computer that may be included in a system such as that shown in FIG. 1.

FIG. 2 shows one embodiment of a network computer 200, according to one embodiment of the invention. Network computer 200 may include many more or less components than those shown. The components shown, however, are sufficient to disclose an illustrative embodiment for practicing the invention. Network computer 200 may be configured to operate as a server, client, peer, a host, or any other device. Network computer 200 may represent, for example projection alteration device 108 of FIG. 1, and/or other network devices.

Network computer 200 includes processor 202, processor readable storage media 228, network interface unit 230, an input/output interface 232, hard disk drive 234, video display adapter 236, and memory 226, all in communication with each other via bus 238. In some embodiments, processor 202 may include one or more central processing units.

As illustrated in FIG. 2, network computer 200 also can communicate with the Internet, or some other communications network, via network interface unit 230, which is constructed for use with various communication protocols including the TCP/IP protocol. Network interface unit 230 is sometimes known as a transceiver, transceiving device, or network interface card (NIC).

Network computer 200 also comprises input/output interface 232 for communicating with external devices, such as a keyboard, or other input or output devices not shown in FIG. 2. Input/output interface 232 can utilize one or more communication technologies, such as USB, infrared, Bluetooth™, or the like.

Memory 226 generally includes RAM 204, ROM 222 and one or more permanent mass storage devices, such as hard disk drive 234, tape drive, optical drive, and/or floppy disk drive. Memory 226 stores operating system 206 for controlling the operation of network computer 200. Any general-purpose operating system may be employed. Basic input/output system (BIOS) 224 is also provided for controlling the low-level operation of network computer 200.

Although illustrated separately, memory 226 may include processor readable storage media 228. Processor readable storage media 228 may be referred to and/or include computer readable media, computer readable storage media, and/or processor readable storage device. Processor readable storage media 228 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 226 further includes one or more data storage 208, which can be utilized by network computer 200 to store, among other things, applications 214 and/or other data. Data storage 208 may be employed to screen database 210. Screen database 210 may include information for a plurality of different screen, such as size, shape, location of specific surface elements, or the like. In various embodiments, the projector system may determine a type of screen or screen identifier based on an embedded code of surface elements in the screen. Based on this detected information, screen database 210 may be utilize to determine additional information regarding the screen.

Data storage 208 may further include program code, data, algorithms, and the like, for use by a processor, such as processor 202 to execute and perform actions. In one embodiment, at least some of data store 208 might also be stored on another component of network computer 200, including, but not limited to processor-readable storage media 228, hard disk drive 234, or the like.

Applications 214 may include computer executable instructions, which may be loaded into mass memory and run on operating system 206. Applications 214 may include display surface detector 219 and/or projection modifier 220.

Display surface detector 219 may utilize light reflected off FRR elements to determine a size, shape, and/or orientation of the display surface of the screen relative to the projector system. Projection modifier 220 may modify the size, shape, and/or orientation or the projected to stay within the determined display surface.

General System Description

Figure 3A:
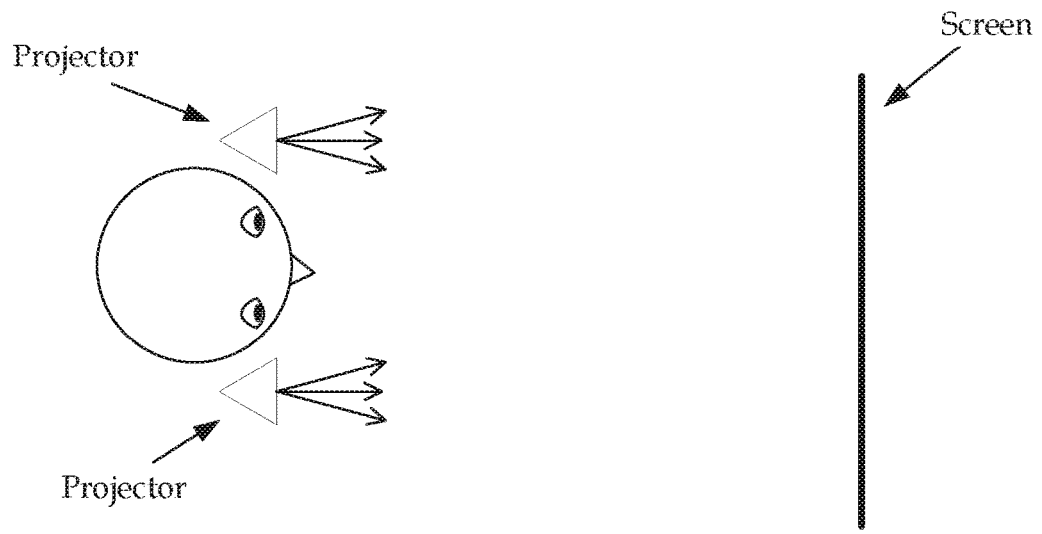
FIGS. 3A and 3B illustrate example embodiments of head-mounted projector systems.
Figure 3B:
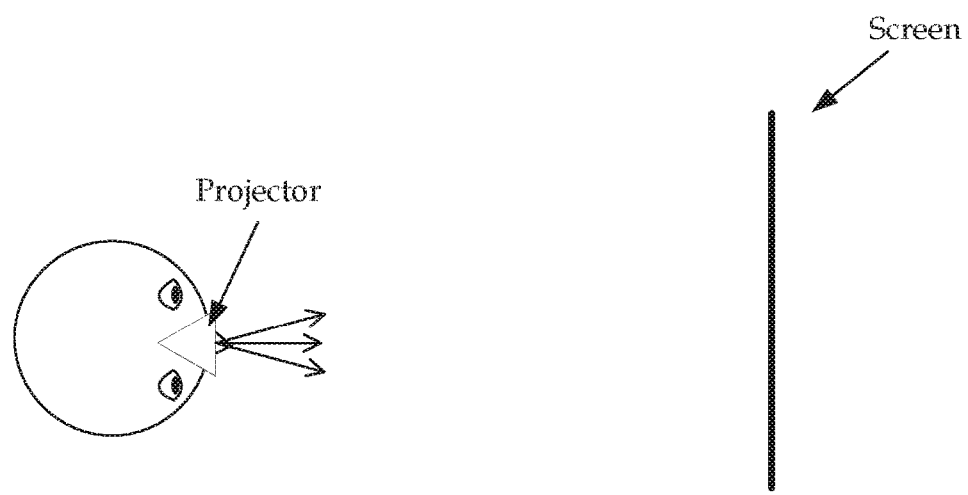

FIGS. 3A and 3B illustrate example embodiments of head-mounted projector systems. FIG. 3A illustrates a head-mounted projection system that includes two projectors, one adjacent to each eye of the user (or wearer). Each projector may project an image on a screen positioned in front of the user. FIG. 3B illustrates an alternative head-mounted projection system that includes a single projector positioned between the user's eyes.

The type of projector(s) may be any of a variety of different projection type imaging systems/technologies. Examples of such projectors include, but is not limited to, a fully rastered imaging system, such as an LCoS (Liquid Chrystal on Silicon) or DLP (Digital Light Processor); any other kind of rastered imaging display device, with a projection via projective optics to a projection surface where it is viewed by the viewer; a scanning MEMS (Micro Electronic Mechanical System) pixel sequential projection system, such as PhotonJet "UltraLight" where a pixel or line is scanned across the screen sequentially; or the like.

In various embodiments, the exit aperture (e.g. projection lens optics or scan mirror, projection window or scanning beam exit point) of the projector may be mounted or otherwise positioned as close as possible to the user's eye. This positioning can help to minimize the observation angle—the angle of deviation between the outgoing rays emanating from the projector and the reflected incoming rays seen by the eye—which can thereby maximize the intensity of the projected light reflected from the display surface. The net effect may result in the light being substantially concentrated towards the viewer's eye, which can make the system both energy efficient and private.

In some embodiments, the projection system may include one or more sensors or cameras to capture light reflected off the screen. This reflected light can be used as feedback to enable the system to alter or modify the projected image based on the feedback. As described herein, the screen (that is projected upon) may include various different types of surface elements, such as retro reflective fiducial structures. In other embodiments, the display surface may have a special optical surface structure, for example with retro reflecting facets such as described in U.S. patent application Ser. No. 13/877,652, which is herein incorporated by reference. In yet other embodiments, the display surface might be a conventional lambertian reflection surface, and retro reflective structures might be employed for fiducial references to enhance optical feedback as described herein (e.g., for display surface tracking, interactivity, or the like).

It should be recognized that although embodiments are described with one or two projectors, embodiments are not so limited. But rather, because of the feedback described herein, the head-mounted projection system's configuration becomes flexible and modular. In various embodiments, the same basic architecture described herein may be employed with one, two, or more projectors. For example, for an extra wide field of view, the projector system may support many projector and camera mounting options, such as next to, below, or above the eye. In some other embodiments, a wide range of screen positions, sizes, shapes, configurations (e.g., multi panel screens, such as fan like multi-screen, or folded screens), or the like may be employed using embodiments described herein along with using relay optics or fibers waveguides to move the light source and/or the imaged light.

Figure 4:
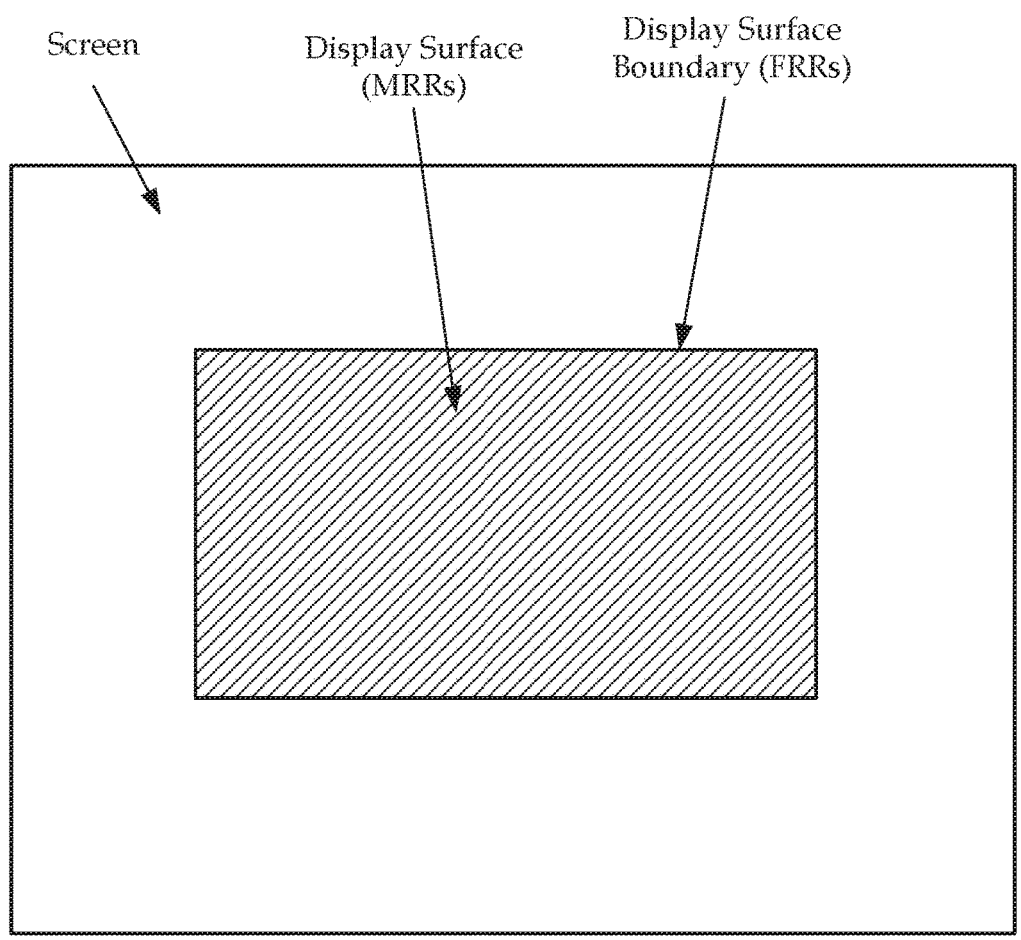
FIG. 4 illustrates an example embodiment of a screen with multiple different types of surface elements.

FIG. 4 illustrates an example embodiment of a screen with multiple different types of surface elements. These surface elements can reflect light back to the sensors or camera in such a way that a variety of different information can be obtained from the surface elements. This information can then be used to provide automated view adjustment, privacy, annotations, scanning and interactivity. So, specially configured embedded retro reflective fiducial structures enable strong and accurate spatially multiplexed optical feedback substantially invisible to the user.

As illustrated, a screen may include a display surface. The display surface may be a lambertian surface, or it may include a plurality of Modified Retro Reflective (MRR) elements positioned throughout the display surface. Example MRR elements are described in more detail below in conjunction with FIGS. 6, 7, and 9. The display surface may be bordered by a thin frame of Full Retro Reflective (FRR) elements. This border includes one or more edges of the display surface. The FRR elements may define a boundary of the display surface. Example FRR elements are described in more detail below in conjunction with FIG. 5. In some embodiments, the projector system may not project an image onto the screen until the display surface is detected and determined to be sufficiently in view, which can give the effect that the screen is turned on/or depending on affirmative detection of the display surface.

In various embodiments, the FRR elements may be positioned on the screen to create an embedded code. In some embodiments, this embedded code may be created as a bar code, QR code, binary code, or the like. The embedded code can identify the type of screen that is detected. In other embodiments, fiducial features embedded in or adjacent to the display surface on the screen can be combined with screen shape and size to allow the system to identify the screen type. Once the type of screen is determined, the system can choose the right projection settings to modify the projected image to be viewable on the display surface. In some embodiments, the type of screen can be used to identify specialized surface elements, such as for example, WMRR elements as described in conjunction with FIGS. 9 and 10.

The embedded code may also provide a screen identification (ID), which may be utilized to unlock the screen or content. Similar to the embedded codes described above, the FRR elements and/or WMRR facets can contain secret embedded codes or patterns that identify and unlock the screen and/or enable the content. In some embodiments, each screen have a unique ID and/or are assigned a sequential identity (e.g. pages). Based on these unique IDs, the system may detect more than one screen or more than one display surface on a screen based on the embedded code/unique ID of the screen. In at least one embodiment, the projector system may memorize content and associate the screen sequence or location with the specific content, information category (e.g., book, newspaper, art project, shopping list, videos, or the like), or the like. In some embodiments, returning or scrolling to prior uses may also be employed.

Figure 5:
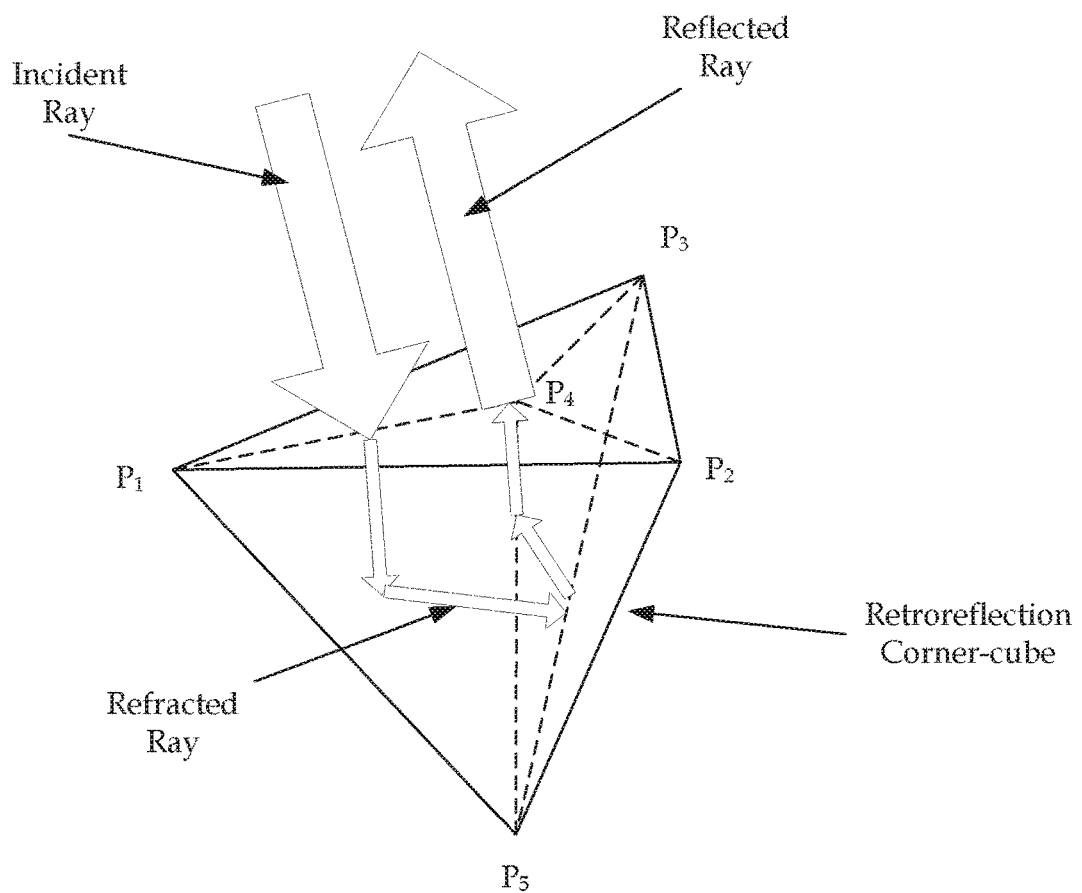
FIG. 5 illustrates an example FRR element.

FIG. 5 illustrates an example FRR element. In various embodiments described herein, a screen may include a plurality of FRR elements. The FRR elements serve as fiducial tracking elements by reflecting light back directly to cameras, sensors, or other detectors in the projector system. In various embodiments, the FRR elements may be positioned in various aspects of a screen to provide different information, which is described in more detail below. Briefly, however, FRR elements may be used to indicate display surface boundaries, size of the projection surface, identifiers of the type of screen, embedded codes to unlock the screen or specific content, pointing and/or touching virtualizations, or the like.

In some embodiments, FRR elements can be arranged on the screen in a thin frame around the display or projection surface, such as illustrated in FIG. 4. Since the FRR elements reflect projected light back to the source, a sensor or camera on the projector system can capture the reflected light to provide optical location feedback, which can be used to identify the boundary of the display surface. Once the boundary of the display surface is determined and the display surface detected (from the thin frame of FRR elements) the projection system can project images on the display surface.

In various embodiments, the projector system may continuously monitor the FRR elements to track the display surface and automatically adjust the projected image relative to the tracked display surface. So, regardless of the position and orientation of the display surface in relation to the projector system, the display surface can be discovered and the projected images and/or the image content can be modified based on the position of the display to keep the projected image on the display surface.

For example, in some embodiments, the size, shape, and/or orientation of the projected image may be continuously modified to stay within the boundary of the display surface based on movement of the projector system or the screen. In other embodiments, screen motion (e.g., lifting or shaking the screen) or head motion relative to the screen can be utilized as a user interface or user interactions with the projector system. For example, if the user approaches the screen—which may be determined since the size of the display surface relative to the projector system would become larger—then a particular section of the screen (e.g. a large segmented surface or a series of screens) would cause an action on the screen (e.g. an image or video sequence).

In some embodiments, multiple projectors (with sensors) in the projector system may observe a same fiducial element (e.g., an FRR element) in the border (which may occur at a same point in time). In at least one such embodiment, a left and right projector may observe a same FRR element with stereo disparity. From this stereo disparity, a distance to the commonly viewed point can be determined, which can provide a distance from the projector system to the screen.

In various other embodiments, the display surface may include additional FRR elements or other fiducial markings to provide other information. For example, in some embodiments, the display surface may include FRR elements to sectionally divide the display surface into a grid. This grid than then be utilized for a variety of different purposes, such as where the display surface is greater than the projected image, the grid can enable the projector system to maintain the position of the projected image in the same position on the display surface. In a similar implementation, the projector system may be capable of using the grid to provide split-screen capabilities, picture-in-picture capabilities, or the like.

Figure 6:
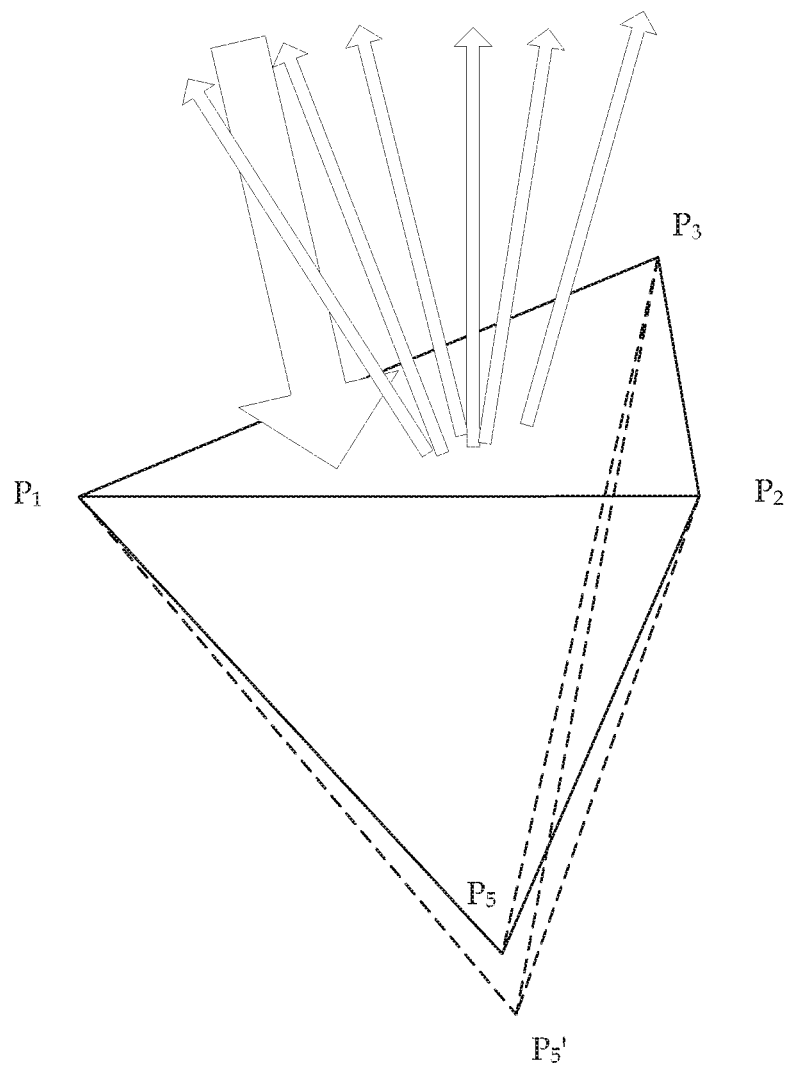
FIG. 6 illustrates an example MRR element.

Along with the FRR elements, the screen may also include a plurality of MRR elements. FIG. 6 illustrates an example MRR element. MRR elements may be mirror-like screen elements that may be positioned throughout the display surface (i.e., inside the FRR element boundary), such as illustrated in FIG. 4. The MRR elements serve primarily to reflect the projected light back to the user's eye, resulting in the perception of the projected image. As illustrated, the light is reflected at one or more angles away from the projected light. In this way the light does not reflect directly back to the projector, but rather it can reflect to a user's eye.

Figure 7:
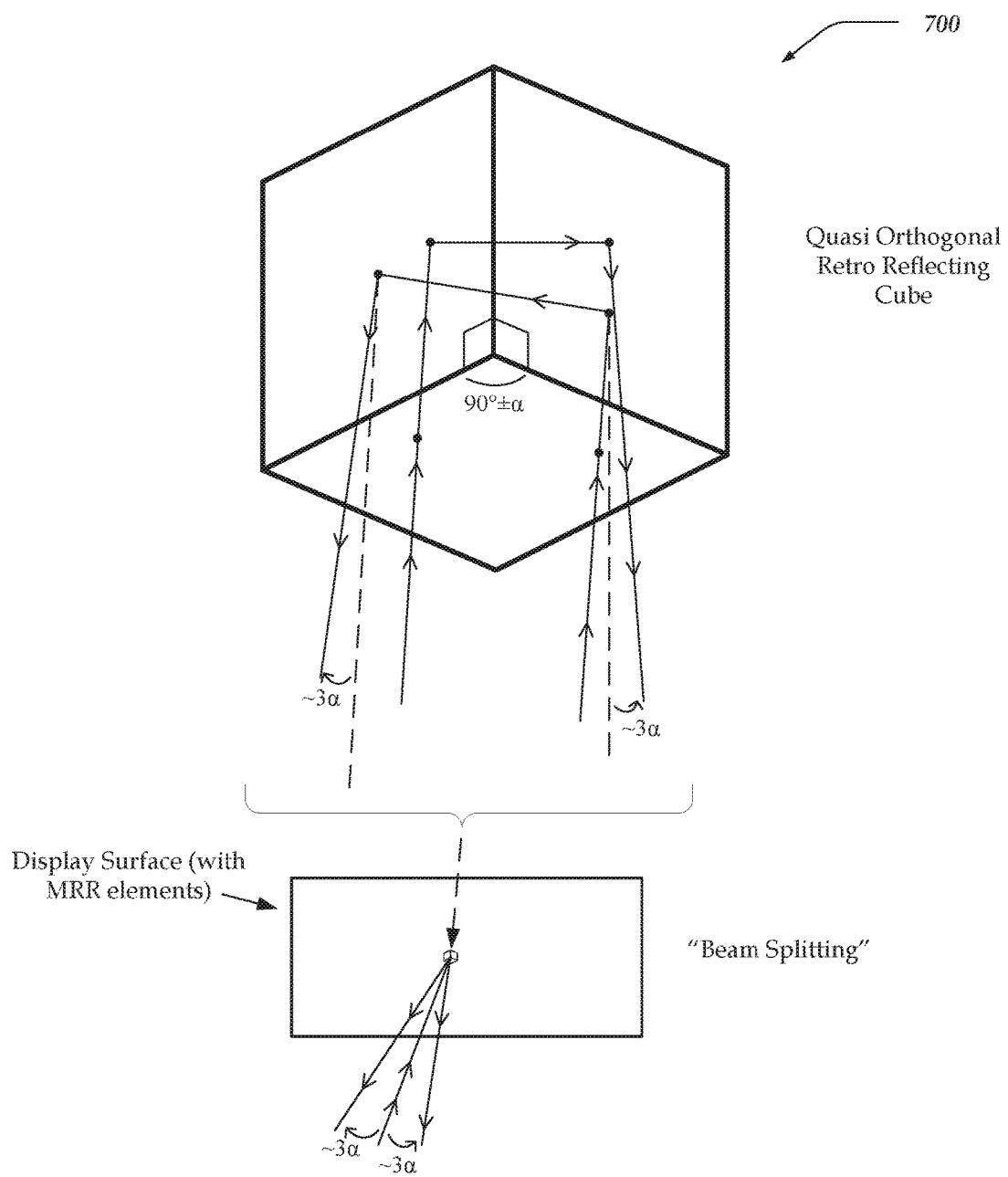
FIG. 7 illustrates another example of an MRR element.

FIG. 7 illustrates another example of an MRR element. In various embodiments, the MRR facet may have a modified cubic or pyramidal (orthogonal tetrahedral, a "cut off" cube corner) retro-reflector. One of the orthogonal inter-face angles may be modified from pure 90 degrees (orthogonal) to 90 degrees minus or plus alpha (quasi orthogonal). This modification splits the retro-reflecting image field in two equal fields with a direction offset which is a function of alpha (approx. 3×alpha). Thus, if the projector is mounted exactly in the middle between the eyes, at certain viewing distances the returning view cones fall on each eye, which is illustrated in FIG. 8.

Figure 8:
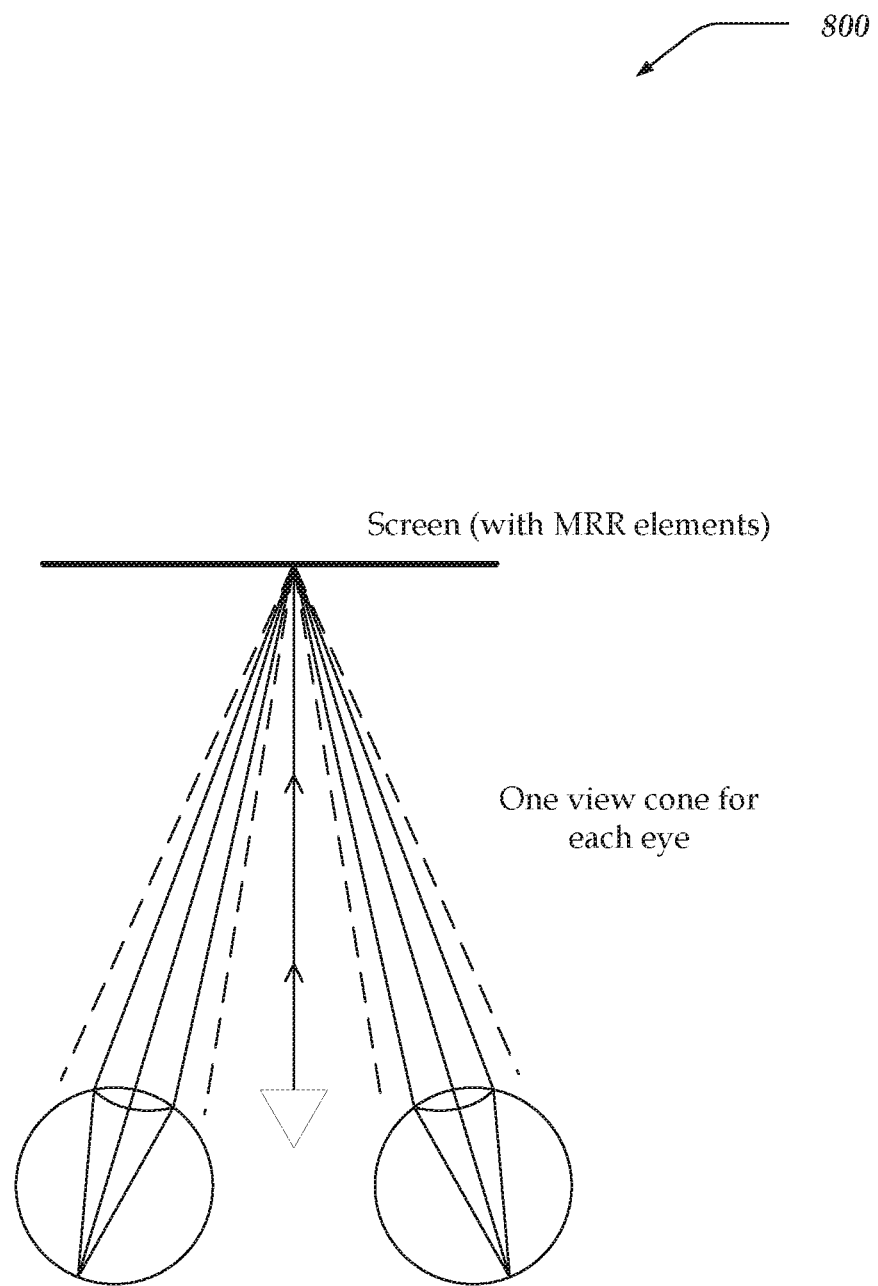
FIG. 8 illustrates an example embodiment of a single projector that utilizes MRR elements to split the projected beam.

FIG. 8 illustrates an example embodiment of a single projector that utilizes MRR elements to split the projected beam into one view cone for each eye of the user.

Figure 11A:
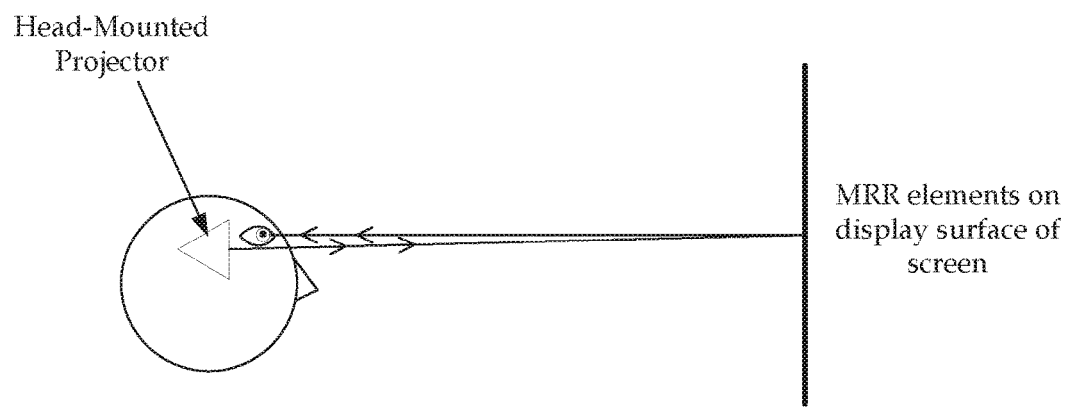
FIGS. 11A and 11B illustrate an example of a monocular projection.
Figure 11B:
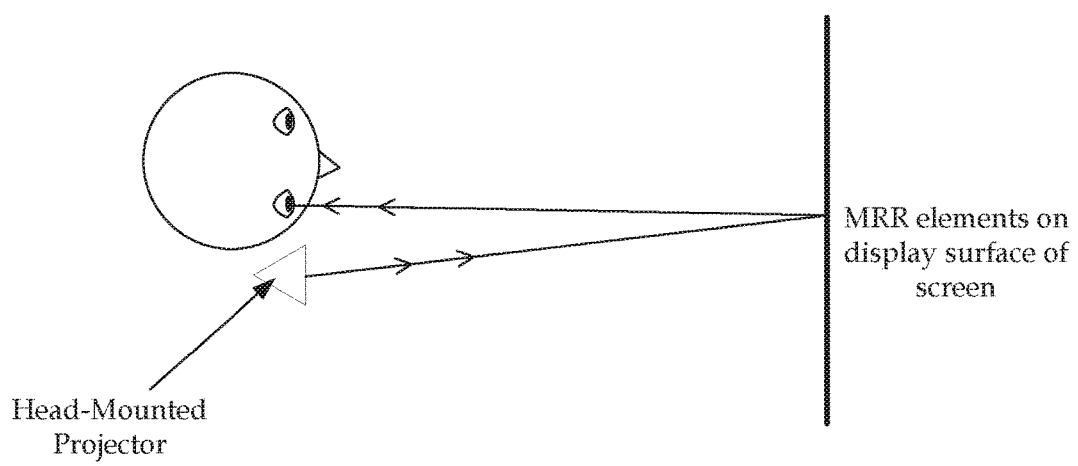
Figure 12A:
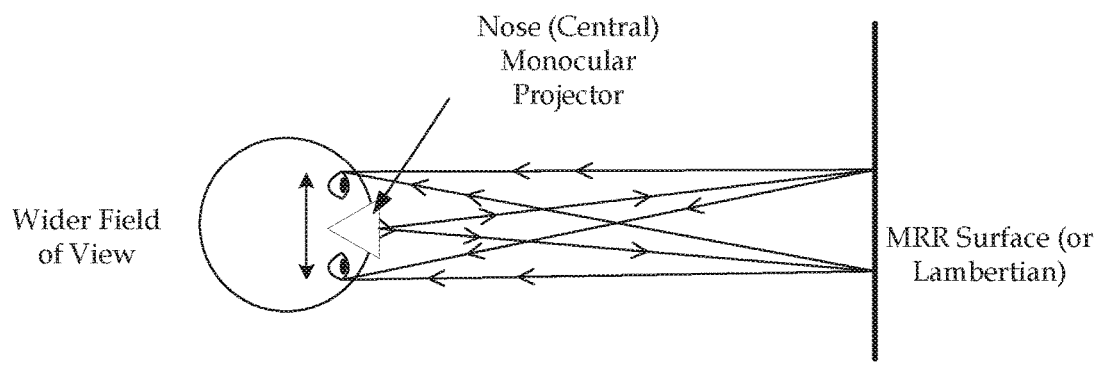
FIGS. 12A-12C illustrate an example of a single-projector system.

As described herein, MRR elements may be designed to reflect light from one projector to one eye (e.g., as illustrated in FIG. 11B), split the light beam from one projector to multiple eyes, (e.g., as illustrated in FIGS. 7 and 8), or to reflect light from one projector to both eyes (e.g., as illustrated in FIG. 12A). In various other embodiments, MRR elements may be designed to direct light from one projector position (e.g. left-side projector) to an opposite projector position (e.g., a right-side projector).

Figure 9:
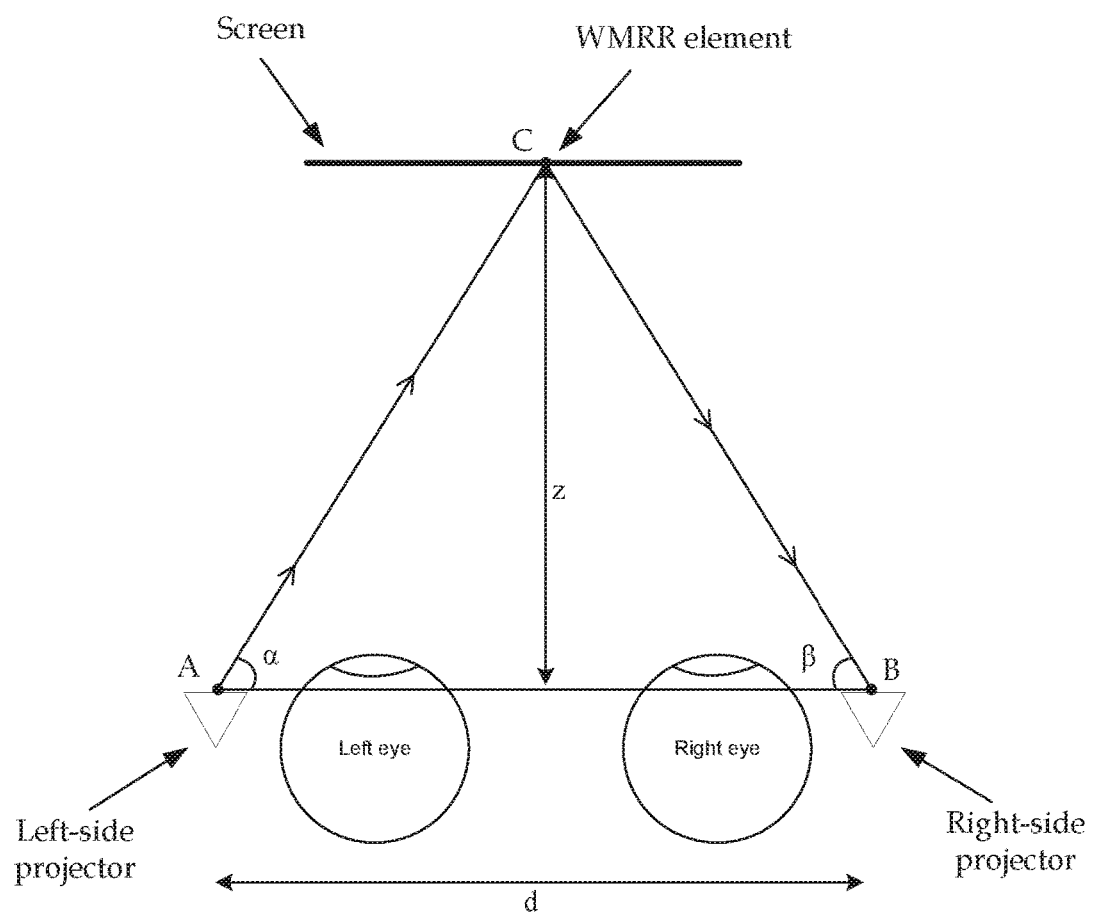
FIG. 9 illustrates an example of a projector system that utilizes MRR elements to reflect light from one projector to another projector in the projector system.

FIG. 9 illustrates an example of a projector system that utilizes MRR elements to reflect light from one projector to another projector in the projector system. In various embodiments, WMRR elements may be utilized to determine a distance between the user and the screen, which can enable the position tracking of the display surface to use triangulation (structured light or stereoscopy with the known baseline between the two projectors) to determine the 3D position of the display surface edges or of the screen fiducial lines or points.

In at least one of various embodiments, the screen or display surface may include one or more wide modified retro reflector (WMRR) elements. In some embodiments, these WMRR elements may be positioned at specific locations on the screen.

WMRR elements may include a spread angle or beam split angle wide enough to miss the opposite eye but to land on the adjacent/opposite projector. As illustrated, the left-side projector may act like a structured light transmitter (e.g., at point A). And the right-side projector may act as a triangulating receiver (e.g., at point B). So, the WMRR element (e.g., at point C) reflects a light ray (relay style) from the left-side projector towards the right-side projector/receiver.

The left-side transmitting projector may selectively illuminate one of the pixels that corresponds to the surface location of a WMRR element (which may be referred to as a WMRR fiducial reference point). In some embodiments, this pixel may already be known. For example, by employing embodiments described herein, the type of screen may be determined, which may have a known WMRR element location. In other embodiments, the WMRR element location may be detected by sequentially illuminating each pixel until the right-side projector detects the illuminated pixel. In various embodiments, since the projector system knows the position of the WMRR fiducial element on the screen (based on the pixel it is illuminating), it can also calculate the direction of the transmitted ray (shown as projection angle α). Note that α in this figure is different than the alpha described with respect to the angle of reflection in FIGS. 7 and 10.

The right-side projector/receiver may include a sensor or detector (e.g., a camera) that can detect the incoming direction (shown as angle β) (the angular position in its field of view) of reflected light from the left-side projector.

In various embodiments, the system may calculate the distance z between the projector system and the screen by triangulating the projected light and the reflected light. By knowing (1) the projection angle α, (2) the detected angle β, and (3) the base separation distance d between the left transmitter (Tx) of the left-side projector (point A) and right-side receiver (Rx) of the right-side projector (point B), the system can estimate the size and shape of triangle ABC to estimate the Z distance between the projector system and the WMRR element (or the pixel at point C (the apex of triangle ABC).

It should be recognized that the left-side and right-side designations of the projectors is for ease of illustration and the functions of the projectors may be reversed from what is described (e.g., the right-side projector can transmit the light and the left-side projector can receive the reflected light.

Figure 10:
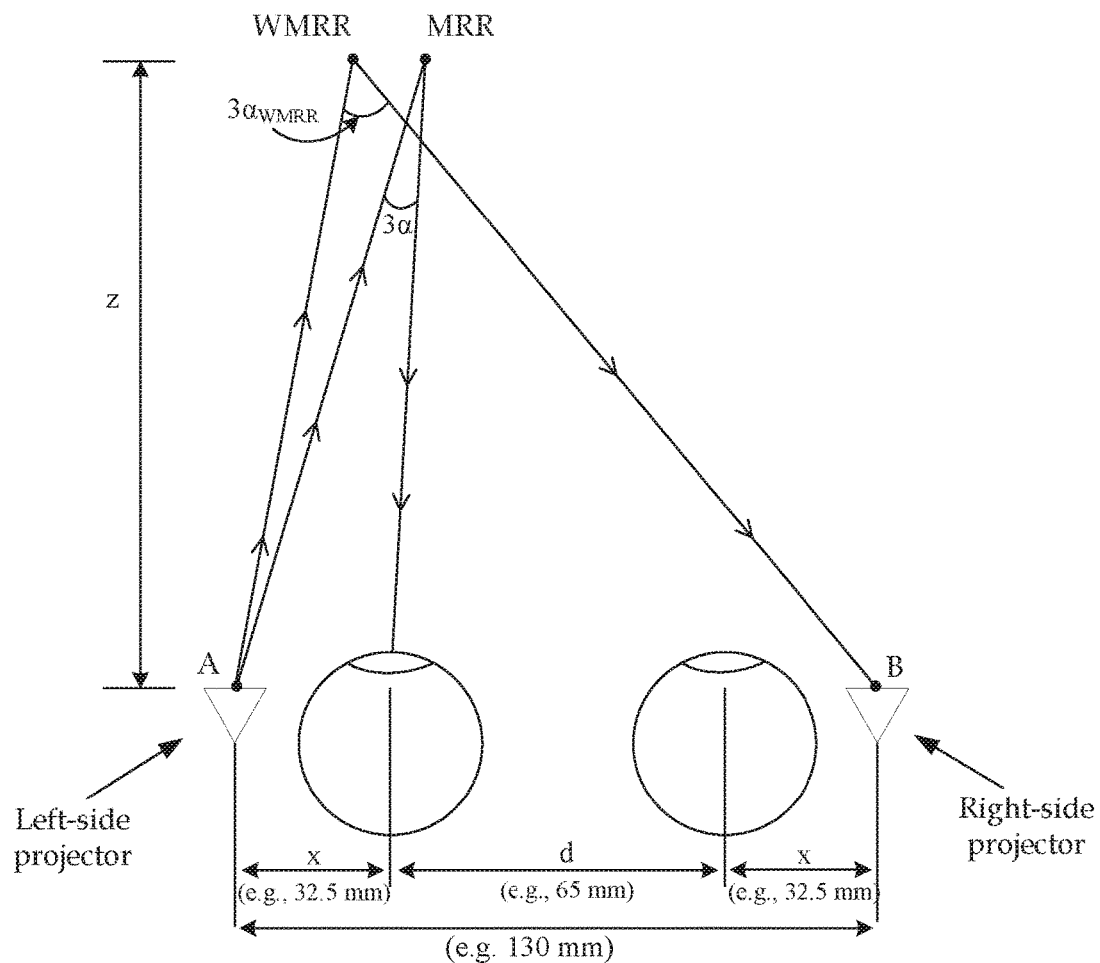
FIG. 10 illustrates a use case example of a projector system that utilizes WMRR elements.

FIG. 10 illustrates a use case example of a projector system that utilizes WMRR elements. As illustrated, the screen may include MRR elements and WMRR elements.

The MRR elements may reflect light back to the user's eye, while the WMRR element reflects light to the other projector. In this illustration, the WMRR has a spread angle or beam split angle wide enough to miss the opposite eye but to land on the adjacent/opposite projector. For example, if the intra-ocular distance is 65 mm and the lateral offset distance between the eye and its adjacent projector is 32.5 mm, then the total inter-projector/detector distance is 130 mm (2×32.5 mm+65 mm=130 mm), the WMRR may have a deviation angle alpha ($\alpha_{WMRR}$) considerably larger than the deviation angle of the MRRs. For example, the deviation angle alpha for a WMRR may be written as: Tan $3\alpha \approx (2x+d)/z$, where x is the lateral offset of the projector from the pupil, d is the inter ocular distance, z is the distance from the head-mounted projector to the screen and $\alpha_{WMRR}$ is the deviation from one of the orthogonal angles like $\alpha_{FRR}$, but $\alpha_{WMRR} >> \alpha_{FRR}$. In FIG. 10 the angle indicated at WMRR is $3\alpha_{WMRR}$ (3× the deviation angle alpha of the modified Retro-reflector (90 degrees+/−alpha). Alpha is the modification from pure orthogonal FRR of one of the angles. (e.g., creating a split beam effect as denoted in FIG. 7—in this particular case, along an Azimuth (horizontal) direction, since the projectors are horizontally offset from the eyes and from each other in this example.

It should be recognized that other intra-ocular or detector distances may be utilized which may utilize WMRR elements that have different alphas. In some embodiments, the distance from the projector system to the screen may be determined by other methods, such as by utilizing multiple projectors observing a same FRR element with stereo disparity, as described above.

FIGS. 11A and 11B illustrate an example of a monocular projection. In various embodiments, the projection may be monocular, such that the light is reflected off the display surface with a relatively narrow field of view so that only the eye adjacent to the projector can see the light of this adjacent projector. As illustrated, the projector system may include a right-side projector positioned adjacent to the user's right eye. The projected image may be reflected off the MRR elements on the display surface so that the right eye sees only light from the projector that is on the right side of the head.

Although FIGS. 11A and 11B only illustrate the right-side projector, a left side projector may also be employed in a similar manner as described above. In various embodiments, the projector system may include both a right-side projector and a left-side project, such as illustrated in FIG. 3A. Each projector could be similar to the monocular arrangement, and simply create a separate viewable image. For example, in various embodiments, light from a left-side projector may reflect off the MRR elements on the display surface to be visible to only the user's left eye and not the user's right eye. Since a left-side projector can project images for the left eye and the right-side projector can separately project images for the right eye, both projectors can project different images to create 3D effects in the projected image.

Figure 12B:
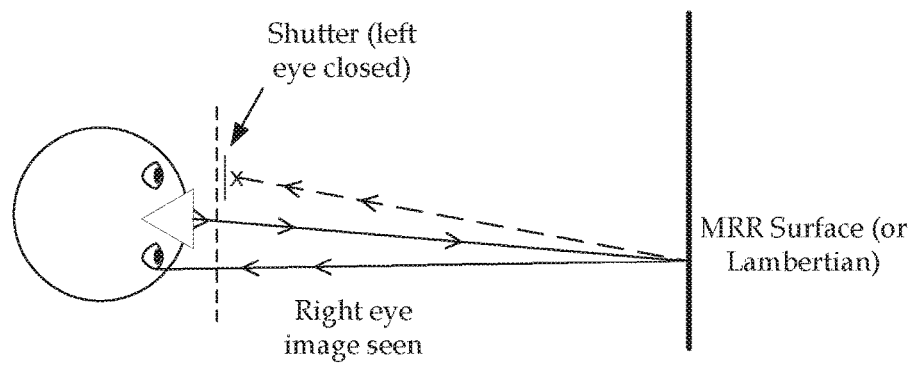
Figure 12C:
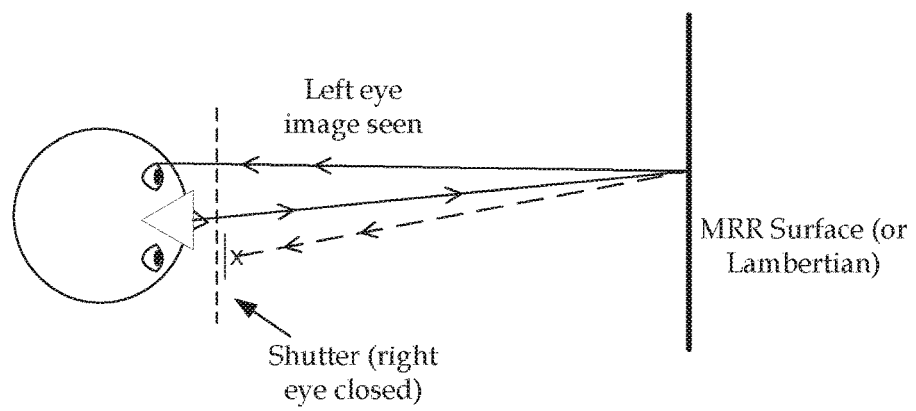

In other embodiments, the light of one projector might be reflected more broadly so as to be seen by both eyes. FIGS. 12A-12C illustrate an example of a single-projector system. As illustrated, a single projector may be positioned between the user's eyes. The projected image may be reflected more broadly than that of the monocular projection such that both eyes can see the projected image, but still with a sufficiently restricted spreading of the reflected light to prevent a third party from seeing the projected image. In some embodiments, the surface elements on the display surface may be specially tuned spherical "cat eye" retro reflectors, which can reflect light from a single projector resulting in a bright image viewable to only the user's eyes.

In various embodiments, the projector system may also include a shutter or filter in front of each eye, which is illustrated in FIGS. 12B and 12C. In some embodiments, the shutters may alternate being open and closed. In this way, the projected images may be time-multiplexed with the alternating shutters to create a stereoscopic 3D perception with a single projector system. Similarly, selective filters can be utilized along with a time-multiplexed image to create a similar 3D perception.

Additional methods, spatial selectivity, wavelength selectivity, or strobing, or any combination thereof can provide an enhanced or optimal signal to noise ratio (SNR). In various embodiments, an optimal SNR minimizes energy required by the projector/tracking system, while increasing the robustness and stability of the system in challenging outdoor mobile environments.

Spatial selectivity in the surface elements may provide reflection angles specifically "tuned" for various different screens, projector systems, configurations, environments, applications, or the like. As described herein, visible image information is seen by the eyes as light projected on the MRR display surface. The image is "fitted" to the display surface based on the information obtain by detecting FRR elements on the screen. For example, the image may be rotated, and/or by an affine transformation, adjusted to exactly match the display surface orientation relative to the projector system. The latter is often called "key-stoning". The "fitted" image is reflected by a field of MRRs (each MRR facet might be 50 to 200 microns, for example).

In some embodiments, the reflection angle of the MRR elements may be specifically "tuned" reflections to provide spatial selective multiplexing. For example, in some embodiments, when the light is narrowly reflected by the MRRs the image can be seen by only one eye. In other embodiments, the reflected light can be either split or reflected slightly wider so both eyes can see it. However, light reflected by the RRs and WMRRs, as described herein, may not be seen by either of the user's eyes. Rather, it is directed towards the sensors or receiving optics in the system for the purposes of creating a strong optical feedback loop signal.

Wavelength selectivity may be employed as narrow band pass tuned reflections and/or sensor optical filters may also be employed. For example, in various embodiments, a dedicated near-infrared (NIR) illuminator mounted next to the projector may be employed. This configuration may be beneficial to clearly see the fiducials in different environments, such as in an outdoor environment. In some embodiments, an additional NIR primary source may be added to the projector system, such as, for example, as part of the illumination sequence in a color field sequential system. As a result, four primaries R, G, B, IR may be utilized as four successive projections (e.g. using a B/W LCoS field sequential imager). In at least one such embodiment, the feedback sensor or camera can use narrow band spectral pass filters to further increase the signal to noise ratio (SNR). Additionally, narrow band pass filters might be added to the FRR and WMRR structures themselves. These narrow band-pass filters can block nearly all the ambient stray light, which might otherwise spuriously be reflected by the screen surface or the fiducial elements.

Strobing or temporal selectivity may also be employed to improve the detection of the display surface and other information provided through the surface elements. For example, in some embodiments, short but powerful illumination bursts (e.g. a one millisecond strobe) with a relatively strong illuminator, matched with an equally short open shutter interval, can further enhance the robustness of the feedback loop described herein.

Figure 13:
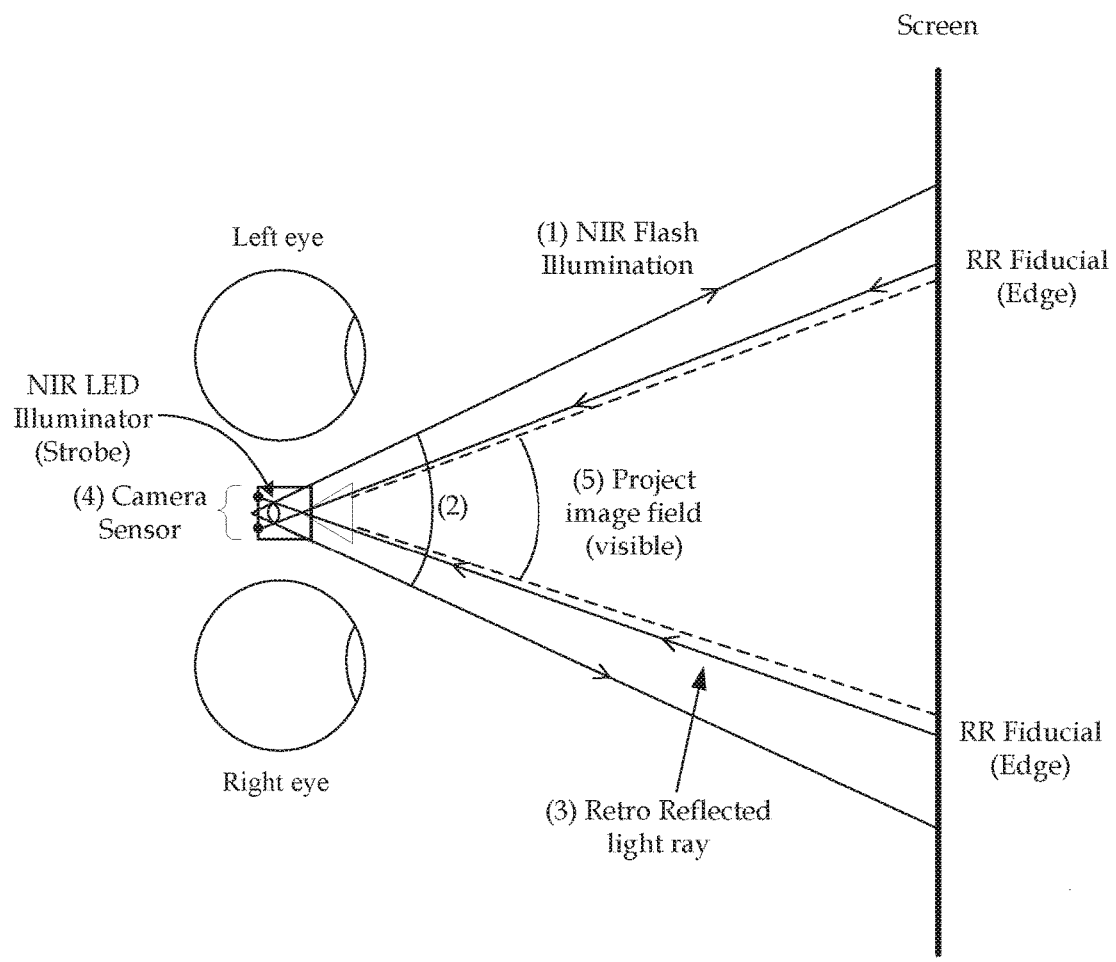
FIG. 13 illustrates an example use case of a smart head-mounted projection system that utilizes NIR strobing.

FIG. 13 illustrates an example use case of a smart head-mounted projection system that utilizes NIR strobing. As illustrated, as single projector system may be positioned between a user's eyes, such as described in conjunction with FIG. 3B. In various embodiments, an NIR strobe may be employed to detect the boundary of the display surface of the screen. Consider the following example:

1) The strobe NIR LED may flash briefly (e.g. 1 m sec, 1 watt, 1 mJoule).

2) The NIR illuminated field emanates over a relatively wide angle forward and onto the screen.

3) The retro reflective edge fiducials, as described herein, reflect some of that outgoing field back towards the projector system.

4) A NIR camera or sensor marks the exact location of the right (R) and left (L) side edges of the display surface in the projector's field of view. It should be understood that a top and/or bottom of the display surface may also be determined. Similarly, if additional information is embedded in the surface elements (e.g., a type of screen, identifier of the screen, or the like) may also be determined from the reflected light.

5) The projector dynamically modifies the image to fit the image field within the marked contours so that only the display surface/area is illuminated by the projector.

It should be understood that the spatial selection effect alone (by itself) of the FRR bezel structures may be strong enough to allow for an RGB system to employ embodiments described herein. In at least one such embodiment, a camera (e.g., a simple B/W (unfiltered) camera) may be collocated with the projector, such that it can detect the contours of the display using only the visible retro reflection at the display surface boundaries (i.e. without the requiring an additional NIR strobe source or a 4th primary). The bright flashing VIS response may be visible at the camera position, but not visible at the eye position.

In some other embodiments, invisible NIR light absorbing ink may be used on the display surface. The ink absorbs the NIR scan source and looks black to the sensor. The smart head-mounted display (HMD) projector system detector (co-located with the projector or on the opposing side for a clearer, unobstructed view) images the NIR images as visible in a suitable color of choice. The ink may automatically vanish physically—e.g. evaporate—after it has been detected clearing the surface for new annotations (analogous to "etch-a-sketch"), such as described in U.S. Pat. No. 8,971,568 entitled "METHOD, APPARATUS, AND MANUFACTURE FOR DOCUMENT WRITING AND ANNOTATION WITH VIRTUAL INK," which is herein incorporated by reference.

Figure 14:
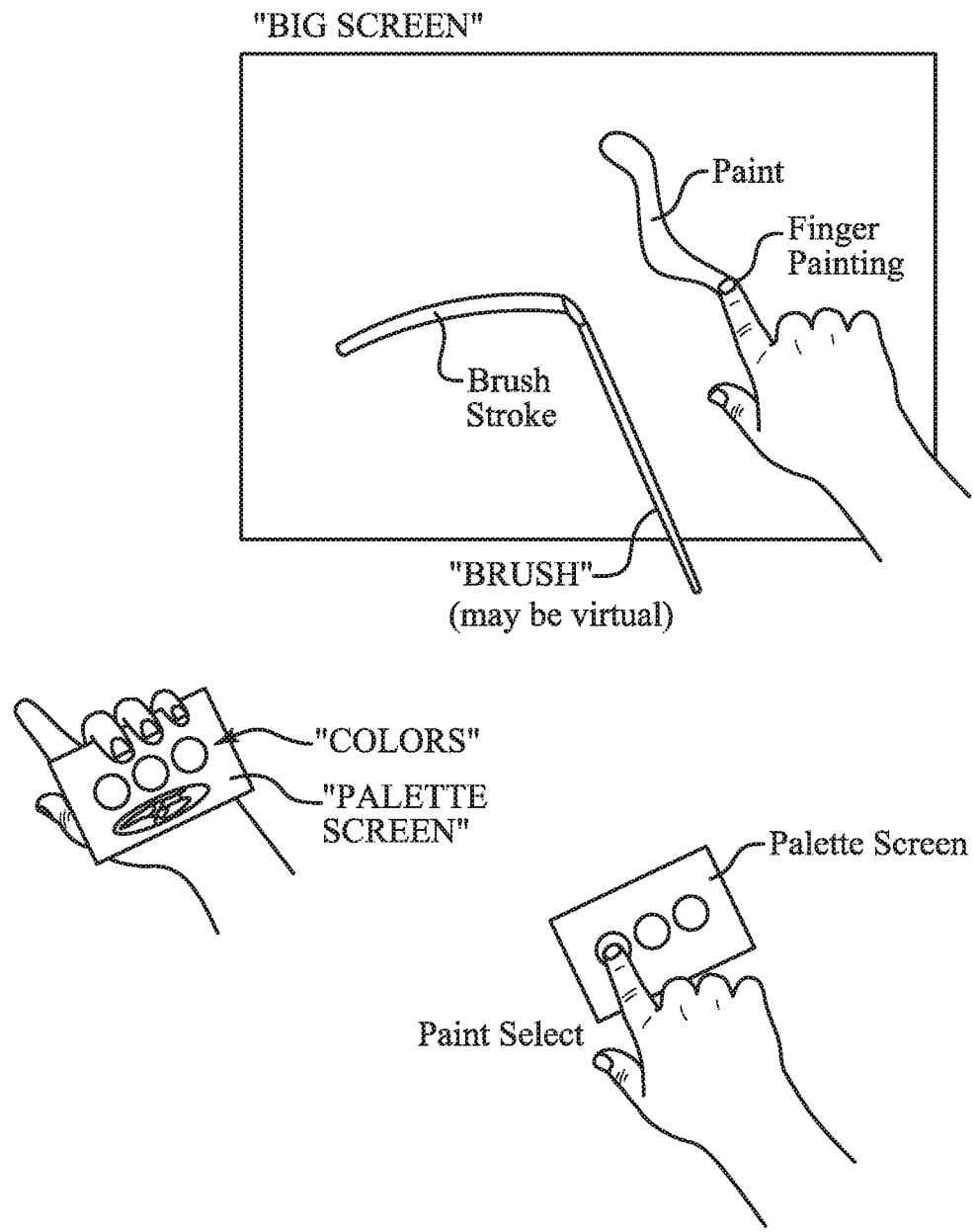
FIG. 14 illustrates an example use case scenario for employing embodiments described herein.

FIG. 14 illustrates an example use case scenario for employing embodiments described herein. In various embodiments, the screen may include additional FRR elements. For example, the display surface may include a plurality of FRR elements embedded throughout the MRR elements. These FRR elements may be utilized to determine various user (e.g., hand) and screen interactions. In various embodiments, the system may detect which of these display surface FRR elements reflect light back to the sensor and which ones do not. Based on the FRR elements that do not reflect light back to the sensor, i.e., something is blocking the light from hitting the FRR and being reflected back, an orientation and motion of an object may be detected (examples of objections and motions may be a finger or hand, which can pose, wave, fan, or the like).

In some embodiments, these FRR elements that are embedded throughout the MRR element projection area may be utilized to provide near line-of-sight pointing based on the FRR elements that are obscured by a fingertip detected the tracking (NIR) camera. Triangulation (or stereo observation) may serve to accurately determine screen finger Z distance, and/or correct for parallax.

In other embodiments, a second screen may be employed to provide the user with additional functionality and interactivity. For example, a small handheld auxiliary screen may serve to select paint pen or brush types. This auxiliary screen may be held in the other hand of the user (typically left had for right handed people). So, the second screen may be a closer working surface (closer relative to the user's eye) that is in front of a larger background screen providing wide view immersion (i.e., the screen with the FRR elements). Based on what the user selected (e.g., by blocking FRR elements), the user can then virtually "paint" onto a larger screen (again by blocking FRR elements in the display surface). In some embodiments, the user may use a long real or virtual "paint brush," magic wand, or pen to interact with the projected image. The use of two screens in this configuration can allow for sculpting and manipulating details of a much larger immersive 3D image, but without Vergence-Accommodation conflict (which otherwise could cause eye strain)

In various embodiments, a same projector system may be utilized for both the close handheld screen and for the larger background screen. The system can change what is being display on each screen by identifying the current screen that the user is looking by employing embodiments described herein.

Figure 15:
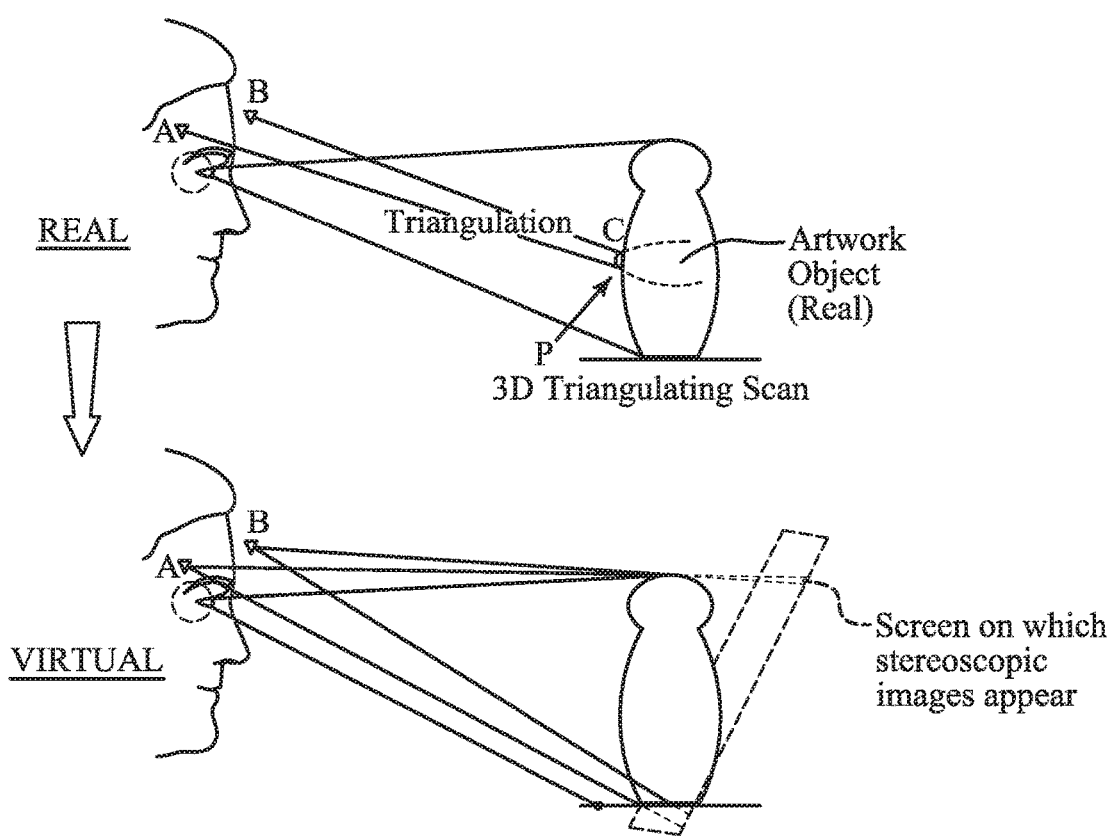
FIG. 15 illustrates an example "Virtualizer" embodiment.

FIG. 15 illustrates an example "Virtualizer" embodiment. "Virtualizer" is the concept of scanning a real object and reproducing it later as a virtual object, as seen in 3D, using a smart head-mounted projection system. As shown in the upper part of FIG. 15, the REAL portion shows a triangulating 3D scan of an object (e.g. an art work) by referencing points A, B, and C, the points of the triangulation between the two projector/scanners (points A and B) and various scan points C on the surface where the laser beam is reflected on the object's surface (see description of FIG. 9.)

Additionally, as shown in the lower part of FIG. 15, the Virtual portion illustrates after the 3D scanning (into memory), the scanned object can be projected onto a screen stereoscopically, with the 3D viewpoint being automatically adjusted to create a real time motion parallax.

In various embodiments, the projector system may include the 3D scanning features to scan an object detected in the field of view after some dwell time or after being rotated in the field of view or encircled during close inspection by the viewer wearing the projector system. The scanned object may be automatically "parsed" and separated from the background. The scanned object may be stored in memory, e.g. as a full 3D point object point cloud, which can then be reproduced at will at any time later on the screen. By employing embodiments described herein, the 3D viewpoint of the scanned object may be adjusted based on the orientation of the detected display surface.

General Operation

The operation of certain aspects of the invention will now be described with respect to FIGS. 16 and 17. In at least one of various embodiments, processes 1600 and 1700 may be implemented by and/or executed on one or more hardware components of a projector system.

Figure 16:
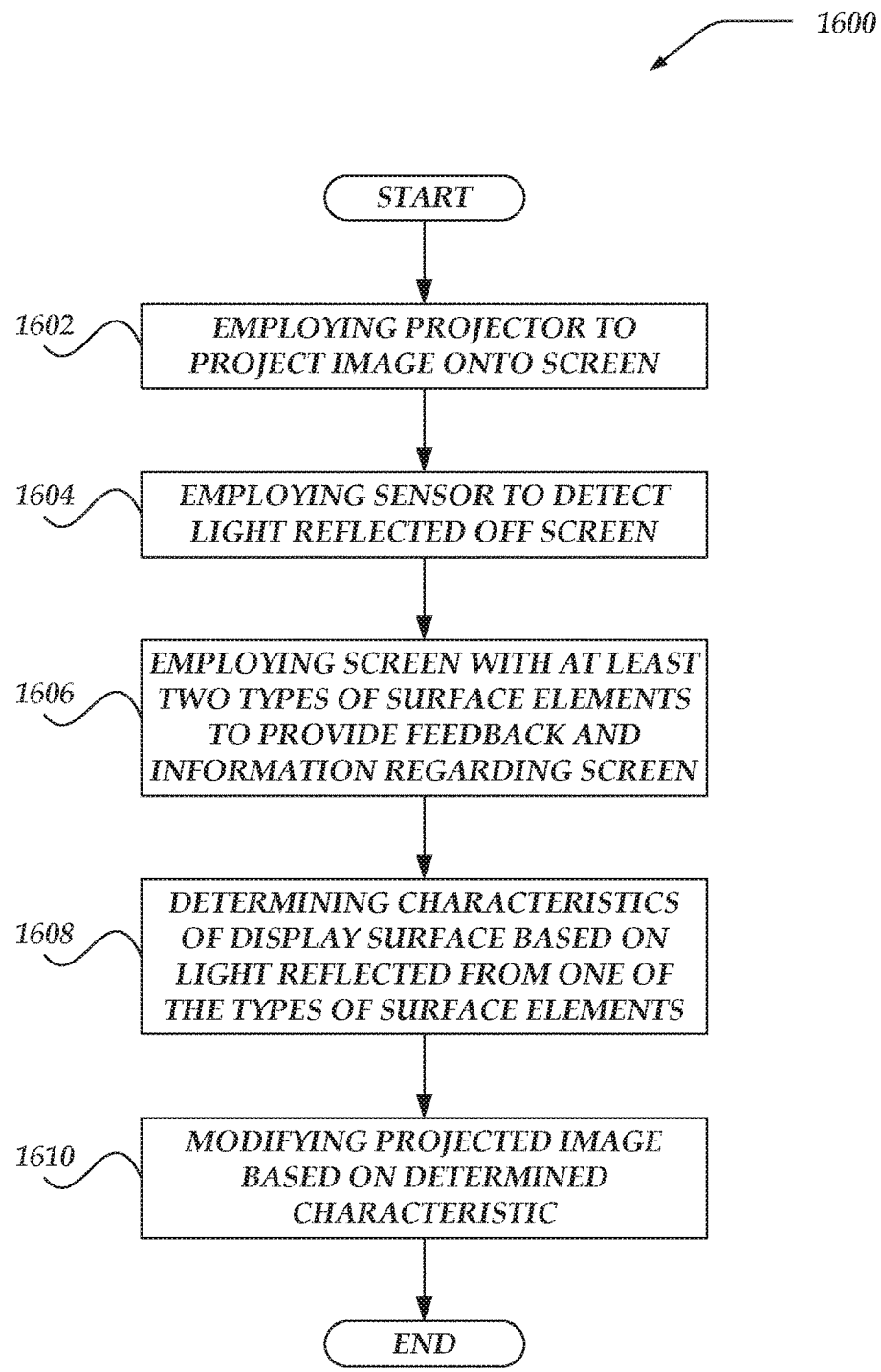
FIG. 16 illustrates a flowchart generally showing a logical process for employing embodiments described herein.

FIG. 16 illustrates a flowchart generally showing a logical process for employing embodiments described herein. Process 1600 may begin, after a start block, at block 1602, where at least one projector may be employed to project an image onto a screen.

Process 1600 may proceed to block 1604, where a sensor may be employed to detect light reflected off the screen. In some embodiments, the sensor may be configured and arranged to be part of the projector. In this way, the sensor can detect light reflected directly back to the projector from FRR elements.

Process 1600 may continue at block 1606, where a screen may be employed. As described herein, the screen may include a plurality of different types of surface elements. For example, a border of a display surface on the screen may comprise a plurality of FRR elements. The display surface may include a plurality of MRR elements positioned throughout the display surface. As described herein, the surface elements may provide a variety of different information regarding the screen and/or the orientation of the screen relative to the projector system, which may be utilized to track the display surface and modify the projected image to remain within display surface. The surface elements may also be utilized as an embedded code to provide additional screen information to the system, as described herein.

Process 1600 may proceed next to block 1608, where a plurality of characteristics of the display surface may be determined. In various embodiments, these characteristics may be determined based on a border of the display surface detected from light reflected off the FRR elements. In some embodiments, the characteristics may include a left, right, bottom, and/or top boundary of the display surface.

Process 1700 may continue next at block 1610, where the projected image may be dynamically modified based on the determined characteristics. In various embodiments, this modification may include changing a size, shape, or orientation of the projected image so that it stays within the display surface and can be fully visible to the user.

After block 1610, process 1600 may terminate.

Figure 17:
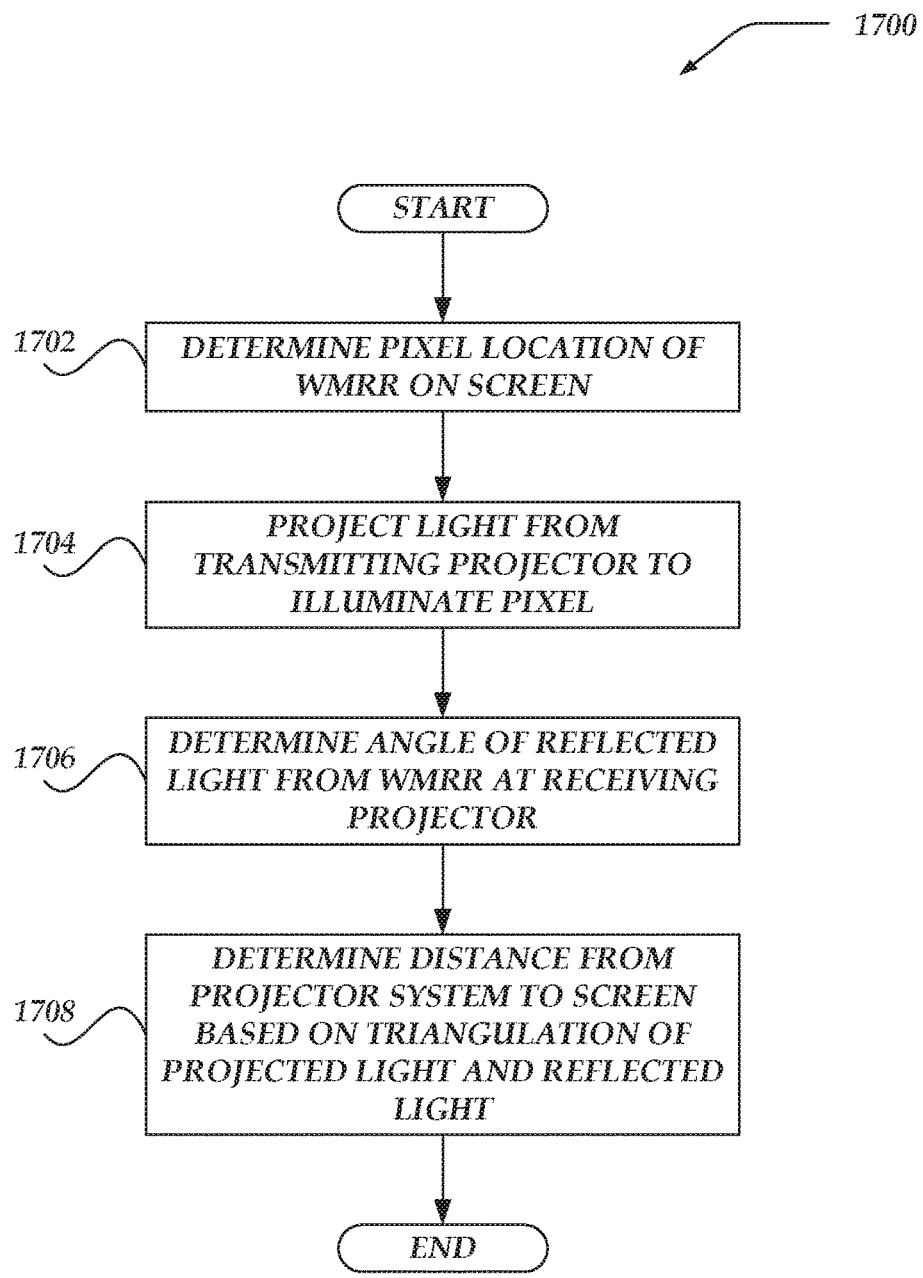
FIG. 17 illustrates a flowchart generally showing a logical process for employing embodiments described herein to determine a distance between a projector system and a screen.

FIG. 17 illustrates a flowchart generally showing a logical process for employing embodiments described herein to determine a distance between a projector system and a screen. Process 1700 may begin, after a start block, at block 1702, where a pixel location of a WMRR on the screen may be determined. In some embodiments, this location may be determined from information regarding the detected screen. For example, FRR elements may include an embedded code that identifies the type or model of screen. Based on the type or model a pixel location of one or more WMRR elements on the screen may be determined, such as by using a look-up table. In some embodiments, the angle of the projected light may be determined based on the pixel location on the screen and the orientation of the projector system relative to the screen (based on a detected border of a display surface on the screen).

Process 1700 may proceed to block 1704, where light may be projected from a transmitting projector to the determined pixel. In some embodiments, the transmitting projector may be a projector on one side of the user's head and a receiving projector (a projector with a sensor) may be on the opposite side of the user's head.

Process 1700 may continue at block 1706, where an angle of light reflected by the WMRR may be determined.

Process 1700 may proceed next to block 1708, where a distance from the projector system to the screen may be determined based on a triangulation of the projected light and the reflected light determined from the angle of projection, angle of reflection, and distance between the transmitting projector and receiving projector.

After block 1708, process 1700 may terminate and/or return to a calling process to perform other actions.

It will be understood that one or more blocks of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing at least some of the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that at least some of the blocks of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A system for enabling a user to view an image on a surface, comprising:
    one or more projectors that project light for the image onto the surface;
    one or more sensors that detect light reflected off the surface;
    a plurality of first elements that are located on the surface and border a display area on the surface, wherein each of the first elements reflect light projected from the one or more projectors to the sensor and one or more portions of this reflected light being non-visible to the user, and wherein a portion of the plurality of first elements are retro-reflective elements that are fiducial markings that are located on a border of the display area on the surface; and
    a plurality of second elements that are positioned within the border of the display area, wherein the plurality of second elements reflect light for the image from the one or more projectors to the user for viewing the image; and
    one or more processors that performs actions, including:
        modifying one or more parameters of the image based on one or more characteristics of the border of the display area.

2. The system of claim 1, further comprising one or more scanners for three-dimensionally scanning one or more physical objects into a memory, wherein the one or more scanned objects are automatically separated from a background and provided for compositing with the image on the surface in real time or at another time.

3. The system of claim 1, further comprising:
    determining the one or more characteristics of the border of the display area based on light reflected to the one or more sensors from the plurality of first elements.

4. The system of claim 1, wherein the processor performs further actions, comprising:
    determining a distance from the one or more projectors to the surface based on a triangulation of light from at least a first projector that is reflected off one or more of the second elements on the surface onto at least a first sensor.

5. The system of claim 1, wherein modifying at least one parameter of the image, further comprises:
    tracking the border of the display area by continuously determining the one or more characteristics of the border; and
    dynamically modifying one or more of a size, a shape, or an orientation of the image to stay within the tracked border.

6. The system of claim 1, wherein the surface includes a plurality of third elements that reflect light from the one or more projectors onto the one or more sensors and that represent an embedded code of surface information, including one or more of a type or a model of a screen that provides the display area.

7. The system of claim 1, wherein one or more of the plurality of the first and the second elements include one or more include full retro reflector (FRR) elements, modified retro reflector (MRR) elements, or wide modified retro reflector (WMRR) elements.

8. The system of claim 1, further comprising:
    a second surface that includes another plurality of elements, wherein the second surface provides a working surface that is smaller than the surface and positioned physically closer to the user, wherein the working surface is employed by the user to select one or more virtual drawing implements, including one or more pens, brushes, or magic wands, and wherein the selected one or more virtual drawing implements are employed to edit one or more images projected on the surface.

9. A method for enabling a user to view an image on a surface, comprising:
    employing one or more projectors to project light for the image onto the surface;
    employing one or more sensors to detect light reflected off the surface;
    a plurality of first elements that are located on the surface and border a display area on the surface, wherein each of the first elements reflect light projected from the one or more projectors to the sensor and one or more portions of this reflected light being non-visible to the user, and wherein a portion of the plurality of first elements are retro-reflective elements that are fiducial markings located on a border of the display area on the surface; and providing a plurality of second elements that are positioned within the border of the display area, wherein the plurality of second elements reflect light for the image from the one or more projectors to the user for viewing the image; and employing one or more processors to modify one or more parameters of the image based on one or more characteristics of the border of the display area.

10. The method of claim 9, further comprising one or more scanners for three-dimensionally scanning one or more physical objects into a memory, wherein the one or more scanned objects are automatically separated from a background and provided for compositing with the image on the surface in real time or at another time.

11. The method of claim 9, further comprising:
determining the one or more characteristics of the border of the display area based on light reflected to the one or more sensors from the plurality of first elements.

12. The method of claim 9, wherein the processor performs further actions, comprising:
determining a distance from the one or more projectors to the surface based on a triangulation of light from at least a first projector that is reflected off one or more of the second elements on the surface onto at least a first sensor.

13. The method of claim 9, wherein modifying at least one parameter of the image, further comprises:
tracking the border of the display area by continuously determining the one or more characteristics of the border; and
dynamically modifying one or more of a size, a shape, or an orientation of the image to stay within the tracked border.

14. The method of claim 9, wherein the surface includes a plurality of third elements that reflect light from the one or more projectors onto the one or more sensors and that represent an embedded code of surface information, including one or more of a type or a model of a screen that provides the display area.

15. The method of claim 9, wherein one or more of the plurality of the first and the second elements include one or more include full retro reflector (FRR) elements, modified retro reflector (MRR) elements, or wide modified retro reflector (WMRR) elements.

16. The method of claim 9, further comprising:
a second surface that includes another plurality of elements, wherein the second surface provides a working surface that is smaller than the surface and positioned physically closer to the user, wherein the working surface is employed by the user to select one or more virtual drawing implements, including one or more pens, brushes, or magic wands, and wherein the selected one or more virtual drawing implements are employed to edit one or more images projected on the surface.

17. A computer for enabling a user to view an image on a surface, comprising:
a memory that stores instructions;
a processor that executes the instructions to perform actions, including:
employing one or more projectors to project light for the image onto the surface;
employing one or more sensors to detect light reflected off the surface;
modifying one or more parameters of the image based on one or more characteristics of a border of a display area on the surface;
wherein a plurality of first elements are located on the surface and adjacent to the border of the display area on the surface, wherein each of the first elements reflect light projected from the one or more projectors to the sensor and one or more portions of this reflected light being non-visible to the user, and wherein a portion of the plurality of first elements are retro-reflective elements that are fiducial markings located on a border of the display area on the surface; and
wherein a plurality of second elements are positioned within the border of the display area, wherein the plurality of second elements reflect light for the image from the one or more projectors to the user for viewing the image.

18. The computer of claim 17, wherein the processor performs further actions, comprising:
employing one or more scanners to three-dimensionally scan one or more physical objects into a memory, wherein the one or more scanned objects are automatically separated from a background and provided for compositing with the image on the surface in real time or at another time.

19. The computer of claim 17, wherein the processor performs further actions, comprising:
determining a distance from the one or more projectors to the surface based on a triangulation of light from at least a first projector that is reflected off one or more of the second elements on the surface onto at least a first sensor.

20. The computer of claim 17, wherein the processor performs further actions, comprising:
employing a second surface that includes another plurality of elements to provide a working surface that is smaller than the surface and positioned physically closer to the user, wherein the working surface is employed by the user to select one or more virtual drawing implements, including one or more pens, brushes, or magic wands, and wherein the selected one or more virtual drawing implements are employed to edit one or more images projected on the surface.

* * * * *